United States Patent
Johnson et al.

(10) Patent No.: US 12,546,965 B2
(45) Date of Patent: Feb. 10, 2026

(54) FIBER OPTIC ENCLOSURES AND CORRESPONDING SYSTEMS WITH OPTIONAL SPLITTER RATIO OUTPUTS

(71) Applicant: CORNING RESEARCH & DEVELOPMENT CORPORATION, Corning, NY (US)

(72) Inventors: Kristine Alaina Johnson, Keller, TX (US); Mitchell Harold Stewart, Lincolnton, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 277 days.

(21) Appl. No.: 18/319,767

(22) Filed: May 18, 2023

(65) Prior Publication Data

US 2024/0302617 A1    Sep. 12, 2024

Related U.S. Application Data

(60) Provisional application No. 63/488,904, filed on Mar. 7, 2023.

(51) Int. Cl.
*G02B 6/44* (2006.01)

(52) U.S. Cl.
CPC ....... *G02B 6/44528* (2023.05); *G02B 6/4452* (2013.01); *G02B 6/4454* (2013.01)

(58) Field of Classification Search
CPC .......................... G02B 6/4452; G02B 6/44528; G02B 6/4453; G02B 6/4454; G02B 6/44–4491
See application file for complete search history.

(56) References Cited

U.S. PATENT DOCUMENTS

| | | |
|---|---|---|
| 2011/0123165 A1 | 5/2011 | Barth et al. |
| 2020/0209479 A1 | 7/2020 | Zhang et al. |
| 2023/0168443 A1* | 6/2023 | Hubbard ............. G02B 6/3897 385/135 |
| 2023/0204860 A1* | 6/2023 | Wu ........................ H04B 10/25 385/48 |

OTHER PUBLICATIONS

Extended European search report, EP application No. 24161891.7, dated Jul. 18, 2024, 8 pages, European Patent office.

* cited by examiner

*Primary Examiner* — Thomas A Hollweg
(74) *Attorney, Agent, or Firm* — Kapil U. Banakar

(57) ABSTRACT

Systems, assemblies, and methods for selectively defining optical fiber splitter ratio outputs within an enclosure are provided. The system includes an enclosure comprising a feeder cable with a plurality of main optical fibers that are each connected to either an adapter port or to a splitter that is then connected to split adapter ports. Intermediary connectors are selectively connectable to the adapter ports or split adaptor ports, and the intermediary connectors are connected to additional splitters by intermediary optical fibers. The additional splitters are then each connected to distribution optical fibers, which are connected to sets of distribution ports. The sets of distribution ports are positioned in a panel of the enclosure and accessible for connection to downstream installation optical fibers. Various optical splitter ratio outputs for the distribution ports are selectable depending on which adapter ports the intermediary connectors are connected to.

23 Claims, 15 Drawing Sheets

FIBER OPTIC ENCLOSURES AND CORRESPONDING SYSTEMS WITH OPTIONAL SPLITTER RATIO OUTPUTS

CROSS-REFERENCE TO RELATED APPLICATION(S)

This application claims priority to U.S. Provisional Application No. 63/488,904, entitled "Fiber Optic Enclosures and Corresponding Systems with Optional Splitter Ratio Outputs", filed Mar. 7, 2023, the contents of which is herein incorporated by reference in its entirety.

FIELD OF THE DISCLOSURE

Embodiments of the present disclosure relate generally to network communications equipment and, more particularly, to assemblies and systems for cable or fiber management, such as within communications equipment cabinets and other enclosures.

BACKGROUND OF THE DISCLOSURE

Cables (such as cables used to carry optical fiber) are often routed in and out of communications equipment cabinets and other enclosures in order to connect with various communications equipment. At some network locations, signals carried by the optical fiber are often split within the enclosures into multiple output signals that are routed to respective output ports of the enclosure. Current systems use optical splitter devices to split an incoming optical signal into multiple output optical signals. The splitter devices have a fixed splitter ratio, i.e., a fixed ratio of the number of input optical fibers to the number of output optical fibers. If a different splitter ratio is desired or needed, a technician has to re-configure the system with additional hardware and/or wiring. Further, such a technician must be highly skilled, as many of the communications equipment are densely populated. Such a reconfiguration process adds undesirable cost, time, and risk of damaging the current optical fibers.

BRIEF SUMMARY OF THE DISCLOSURE

Embodiments of the present disclosure provide for various assemblies and systems that cure many of the above noted defects and difficulties. In this regard, various embodiments of the present disclosure provide a simple, effective way to enable transitions between splitter ratio outputs by simply disconnecting intermediary connectors from one set of adapter ports and connecting the same to alternative adapter ports.

As noted herein, current fiber communications equipment are set up to accept and use devices with a preset splitter ratio output (e.g., 1×32, 1×64). The fiber management used to achieve the preset splitter ratio output is preinstalled and configured, such as by using one or more splitters in a protected portion of the communications equipment. This reduces functional optionality for changing splitter ratio outputs. Indeed, in order to make such a change, an experienced technician must access the preinstalled fiber management portion of the fiber communications equipment. This may require disconnecting active service, rewiring, cutting fiber optical cables, or other measures. Such effort comes with a cost in time and maintenance fees, and leaves open the possibility of failures or other issues (e.g., loss of signal quality, accidental wrong wiring or disconnection, among other things). For example, in the event there is a desired change in splitter ratio output, e.g., adjusting from 1×64 to 1×32, a technician likely needs to access a secure portion of the communications equipment, remove a current splitter, and install a new splitter with new wiring connections. This is a highly detailed and intense process, particularly when considering the already dense packing of fiber optical cable within the communications equipment.

In various embodiments of the present invention, however, the splitter ratio output can be quickly and easily changed, such as by a novice technician. Moreover, in some embodiments, such a process may not require access to the fiber management portion of the communications equipment and, instead, can be accomplished by a simple disconnect and reconnect of one or more intermediary connectors. Labels and other indicia can even further aid in directing a technician in how to quickly adjust the splitter ratio output. This avoids needing to give access to the fiber management portion and significantly simplifies the process-cutting down on cost, time, and potential failure issues, such as described above. Moreover, in some embodiments, there may be no need to disconnect any downstream devices/service while still adjusting the splitter output ratio.

In some embodiments, various optional splitter ratios can be predetermined and selectively available. In this regard, depending on how many adapter ports are available, the groupings of distribution ports, and/or the used splitter configurations in the fiber management portion, different selectable splitter ratio output options can be made available depending on which adapter ports the installer connects the intermediary connectors to. This provides for a wide variety of options that can be predetermined and provided, such as based on customer needs, the type of communications equipment, or otherwise.

As an example, in some embodiments, the assemblies and systems are capable of switching between 1×32 and 1×64 splitter output ratios by simply unplugging intermediary connectors from one set of adapter ports and connecting the intermediary connectors to another set of adapter ports. In some embodiments, the assemblies and systems are capable of enabling both 1×32 and 1×64 splitter output ratios at the same time by separating the intermediary connectors and connecting one intermediary connector to one of a first set of adapter ports and connecting the other intermediary connector to one of another set of adapter ports. In some embodiments, multiple or differently configured assemblies may be utilized in cabinets or enclosures.

In an example embodiment, a system is provided for selectively defining optical fiber splitter ratios within an enclosure. The system includes a feeder cable extending into the enclosure. The feeder cable includes a plurality of main optical fibers therein that extend into the enclosure, and the plurality of main optical fibers includes at least a first main optical fiber and a second main optical fiber. The system also includes a first splitter attached to the first main optical fiber and configured to split the first main optical fiber into at least one secondary optical fiber that is connected to a first split adapter port positioned in the enclosure. The second main optical fiber is connected to a second adapter port positioned in the enclosure. The system also includes a first intermediary connector connected to a first intermediary optical fiber, as well as a second splitter attached to the first intermediary optical fiber and configured to split the first intermediary optical fiber into a plurality of first distribution optical fibers that are each connected to one of a first set of distribution ports positioned in the enclosure. The first intermediary connector is connectable to one of the first split adapter port or the second adapter port to enable an installer to selectively define a first splitter ratio for each of the first set of distribution ports such that a first downstream installation optical fiber connected to one of the first set of distribution ports receives output at the first splitter ratio.

In some embodiments, the enclosure may further include a panel that defines an installer portion of the enclosure and a fiber management portion of the enclosure.

In some embodiments, the first intermediary connector and the first set of distribution ports may be accessible from the installer portion of the enclosure, and the first splitter and the second splitter may be within the fiber management portion of the enclosure. The first intermediary optical fiber may lead around or through the panel from the installer portion of the enclosure to the fiber management portion of the enclosure.

In some embodiments, the feeder cable may extend into the fiber management portion of the enclosure.

In some embodiments, the feeder cable may extend into the installer portion of the enclosure.

In some embodiments, the first splitter may be a 1×2 splitter.

In some embodiments, the second splitter may be a 1×32 splitter.

In some embodiments, the second splitter may be a 1×16 splitter.

In some embodiments, the first splitter attached to the first main optical fiber may be configured to split the first main optical fiber into a first plurality of secondary optical fibers that are each connected to one of a first set of adapter ports positioned in the enclosure, and the first set of adapter ports may include at least the first split adapter port and a second split adapter port. The system may further include a second intermediary connector connected to a second intermediary optical fiber and a third splitter attached to the second intermediary optical fiber and configured to split the second intermediary optical fiber into a plurality of second distribution optical fibers that are each connected to one of a second set of distribution ports positioned in the enclosure. The first intermediary connector may be connectable to one of the first split adapter port, the second split adapter port, or the second adapter port to enable an installer to selectively define the first splitter ratio, and the second intermediary connector may be connectable to one of the first split adapter port, the second split adapter port, or the second adapter port to enable the installer to selectively define a second splitter ratio for each of the second set of distribution ports such that a second downstream installation optical fiber connected to one of the second set of distribution ports receives output at the second splitter ratio.

In some embodiments, the first splitter may be a 1×2 splitter, the second splitter may be a 1×32 splitter, and the third splitter may be a 1×32 splitter.

In some embodiments, the first intermediary connector and the second intermediary connector may be connected.

In some embodiments, the first intermediary connector and the second intermediary connector may be separate or separable.

In some embodiments, the plurality of main optical fibers may further include a third main optical fiber, and the system may further include a third splitter attached to the third main optical fiber and configured to split the third main optical fiber into a plurality of secondary optical fibers that are each connected to one of a third set of adapter ports positioned in the enclosure. The third set of adapter ports may include at least a third split adapter port and a fourth split adapter port. The system may also include a second intermediary connector connected to a second intermediary optical fiber and a fourth splitter attached to the second intermediary optical fiber and configured to split the second intermediary optical fiber into a plurality of second distribution optical fibers that are each connected to one of a second set of distribution ports positioned in the enclosure. The first intermediary connector may be further connectable to one of the third split adapter port or the fourth split adapter port to enable an installer to selectively define the first splitter ratio, and the second intermediary connector may be connectable to one of the third split adapter port or the fourth split adapter port to enable an installer to selectively define a second splitter ratio for each of the second set of distribution ports such that a second downstream installation optical fiber connected to one of the second set of distribution ports receives output at the second splitter ratio.

In some embodiments, the first splitter may be a 1×2 splitter, the second splitter may be a 1×16 splitter, the third splitter may be a 1×4 splitter, and the fourth splitter may be a 1×16 splitter.

In some embodiments, the system may further include a third intermediary connector connected to a third intermediary optical fiber and a fifth splitter attached to the third intermediary optical fiber and configured to split the third intermediary optical fiber into a plurality of third distribution optical fibers that are each connected to one of a third set of distribution ports positioned in the enclosure. The third intermediary connector may be connectable to one of the first split adapter port, the second adapter port, the third split adapter port, or the fourth split adapter port to enable an installer to selectively define a third splitter ratio for each of the third set of distribution ports such that a third downstream installation optical fiber connected to one of the third set of distribution ports receives output at the third splitter ratio.

In some embodiments, the first splitter may be a 1×2 splitter, the second splitter may be a 1×16 splitter, the third splitter may be a 1×4 splitter, the fourth splitter may be a 1×16 splitter, and the fifth splitter may be a 1×32 splitter.

In some embodiments, the first set of distribution ports may include 32 distribution ports.

In another example embodiment, an enclosure is provided and configured for selectively defining optical fiber splitter ratios. The enclosure includes a panel that defines an installer portion of the enclosure and a fiber management portion of the enclosure and a feeder cable extending into the enclosure. The feeder cable includes a plurality of main optical fibers therein that extend into the fiber management portion of the enclosure, and the plurality of main optical fibers includes at least a first main optical fiber and a second main optical fiber. The enclosure also includes a first splitter positioned within the fiber management portion, attached to the first main optical fiber, and configured to split the first main optical fiber into at least one secondary optical fiber that is connected to a first split adapter port positioned in the panel and accessible for connection from the installer portion. The second main optical fiber is connected to a second adapter port positioned in the panel and accessible for connection from the installer portion. The enclosure also includes a first intermediary connector connected to a first intermediary optical fiber that leads around or through the panel and into the fiber management portion. The first intermediary connector is accessible in the installer portion. The enclosure also includes a second splitter attached to the first intermediary optical fiber and configured to split the first intermediary optical fiber into a plurality of first distribution optical fibers that are each connected to one of a first set of distribution ports positioned in the panel and accessible for connection from the installer portion. The first intermediary connector is connectable to one of the first split adapter port or the second adapter port to enable an installer to selectively define a first splitter ratio for each of the first set of distribution ports such that a first downstream installation optical fiber connected to one of the first set of distribution ports receives output at the first splitter ratio.

In some embodiments, the first splitter may be a 1×2 splitter.

In some embodiments, the second splitter may be a 1×32 splitter.

In another example embodiment, a method of manufacturing an enclosure configured for selectively defining optical fiber splitter ratios is provided. The method includes positioning a panel within the enclosure to define an installer portion of the enclosure and a fiber management portion of the enclosure and extending a feeder cable into the enclosure. The feeder cable includes a plurality of main optical fibers therein that extend into the fiber management portion of the enclosure, and the plurality of main optical fibers includes at least a first main optical fiber and a second main optical fiber. The method also includes installing a first splitter on the first main optical fiber and positioning the first splitter within the fiber management portion such that the first splitter is configured to split the first main optical fiber into at least one secondary optical fiber that is connected to a first split adapter port positioned in the panel and accessible for connection from the installer portion. The method also includes installing a second adapter port by connecting the second adapter port to the second main optical fiber and positioning the second adaptor adapter port in the panel such that the second adaptor adapter port is accessible for connection from the installer portion. The method also includes installing a first intermediary connector, which is connected to a first intermediary optical fiber, such that the first intermediary optical fiber leads around or through the panel and into the fiber management portion. The first intermediary connector is accessible in the installer portion. The method also includes installing a second splitter on the first intermediary optical fiber and positioning the second splitter within the fiber management portion such that the second splitter is configured to split the first intermediary optical fiber into a plurality of first distribution optical fibers that are each connected to one of a first set of distribution ports positioned in the panel and accessible for connection from the installer portion. The first intermediary connector is connectable to one of the first split adapter port or the second adapter port to enable an installer to selectively define a first splitter ratio for each of the first set of distribution ports such that a first downstream installation optical fiber connected to one of the first set of distribution ports receives output at the first splitter ratio.

In another example embodiment, a system for selectively defining optical fiber splitter ratios within an enclosure is provided. The system includes a feeder cable extending into the enclosure, and the feeder cable includes a plurality of main optical fibers therein that extend into the enclosure. The plurality of main optical fibers includes at least a first main optical fiber, a second main optical fiber, and third main optical fiber. The system also includes a first splitter attached to the first main optical fiber and configured to split the first main optical fiber into a plurality of secondary optical fibers that are each connected to one of a first set of adapter ports positioned in the enclosure. The first set of adapter ports includes at least a first split adapter port and a second split adapter port. The second main optical fiber is connected to a second adapter port positioned in the enclosure, and the third main optical fiber is connected to a third adapter port positioned in the enclosure. The system also includes a first intermediary connector connected to a first intermediary optical fiber and a second splitter attached to the first intermediary optical fiber and configured to split the first intermediary optical fiber into a plurality of first distribution optical fibers that are each connected to one of a first set of distribution ports positioned in the enclosure. The system also includes a second intermediary connector connected to a second intermediary optical fiber and a third splitter attached to the second intermediary optical fiber and configured to split the second intermediary optical fiber into a plurality of second distribution optical fibers that are each connected to one of a second set of distribution ports positioned in the enclosure. The first intermediary connector is connectable to one of the first split adapter port, the second split adapter port, the second adapter port, or the third adapter port to enable an installer to selectively define a first splitter ratio for each of the first set of distribution ports such that a first downstream installation optical fiber connected to one of the first set of distribution ports receives output at the first splitter ratio, and the second intermediary connector is connectable to one of the first split adapter port, the second split adapter port, the second adapter port, or the third adapter port to enable the installer to selectively define a second splitter ratio for each of the second set of distribution ports such that a second downstream installation optical fiber connected to one of the second set of distribution ports receives output at the second splitter ratio.

In another example embodiment, a system for selectively defining optical fiber splitter ratios within an enclosure is provided. The enclosure defines a fiber management portion and an installer portion with a panel extending therebetween, and the system includes a feeder cable extending into the enclosure. The feeder cable includes a plurality of main optical fibers therein that extend into the fiber management portion of the enclosure, and the plurality of main optical fibers includes at least a first main optical fiber, a second main optical fiber, and third main optical fiber. The system also includes a first splitter positioned within the fiber management portion, attached to the first main optical fiber, and configured to split the first main optical fiber into a plurality of secondary optical fibers that are each connected to one of a first set of adapter ports positioned in the panel and accessible for connection from the installer portion. The first set of adapter ports includes at least a first split adapter port and a second split adapter port. The second main optical fiber is connected to a second adapter port positioned in the panel and accessible for connection from the installer portion, and the third main optical fiber is connected to a third adapter port positioned in the panel and accessible for connection from the installer portion. The system also includes a first intermediary connector connected to a first intermediary optical fiber that leads around or through the panel and into the fiber management portion, and the first intermediary connector is accessible in the installer portion. The system also includes a second splitter attached to the first intermediary optical fiber and configured to split the first intermediary optical fiber into a plurality of first distribution optical fibers that are each connected to one of a first set of distribution ports positioned in the panel and accessible for connection from the installer portion. The system also includes a second intermediary connector connected to a second intermediary optical fiber that leads around or through the panel and into the fiber management portion, and the second intermediary connector is accessible in the installer portion. The system also includes a third splitter attached to the second intermediary optical fiber and configured to split the second intermediary optical fiber into a plurality of second distribution optical fibers that are each connected to one of a second set of distribution ports positioned in the panel and accessible for connection from the installer portion. The first intermediary connector is connectable to one of the first split adapter port, the second split adapter port, the second adapter port, or the third adapter port to enable an installer to selectively define a first splitter ratio for each of the first set of distribution ports such that a first downstream installation optical fiber connected to one of the first set of distribution ports receives output at the first splitter ratio, and the second intermediary connector is connectable to one of the first split adapter port, the second split adapter port, the second adapter port, or the third adapter port to enable the installer to selectively define a second splitter ratio for each of the second set of distribution ports such that a second downstream installation optical fiber connected to one of the second set of distribution ports receives output at the second splitter ratio.

BRIEF DESCRIPTION OF THE DRAWINGS

Figure 1:
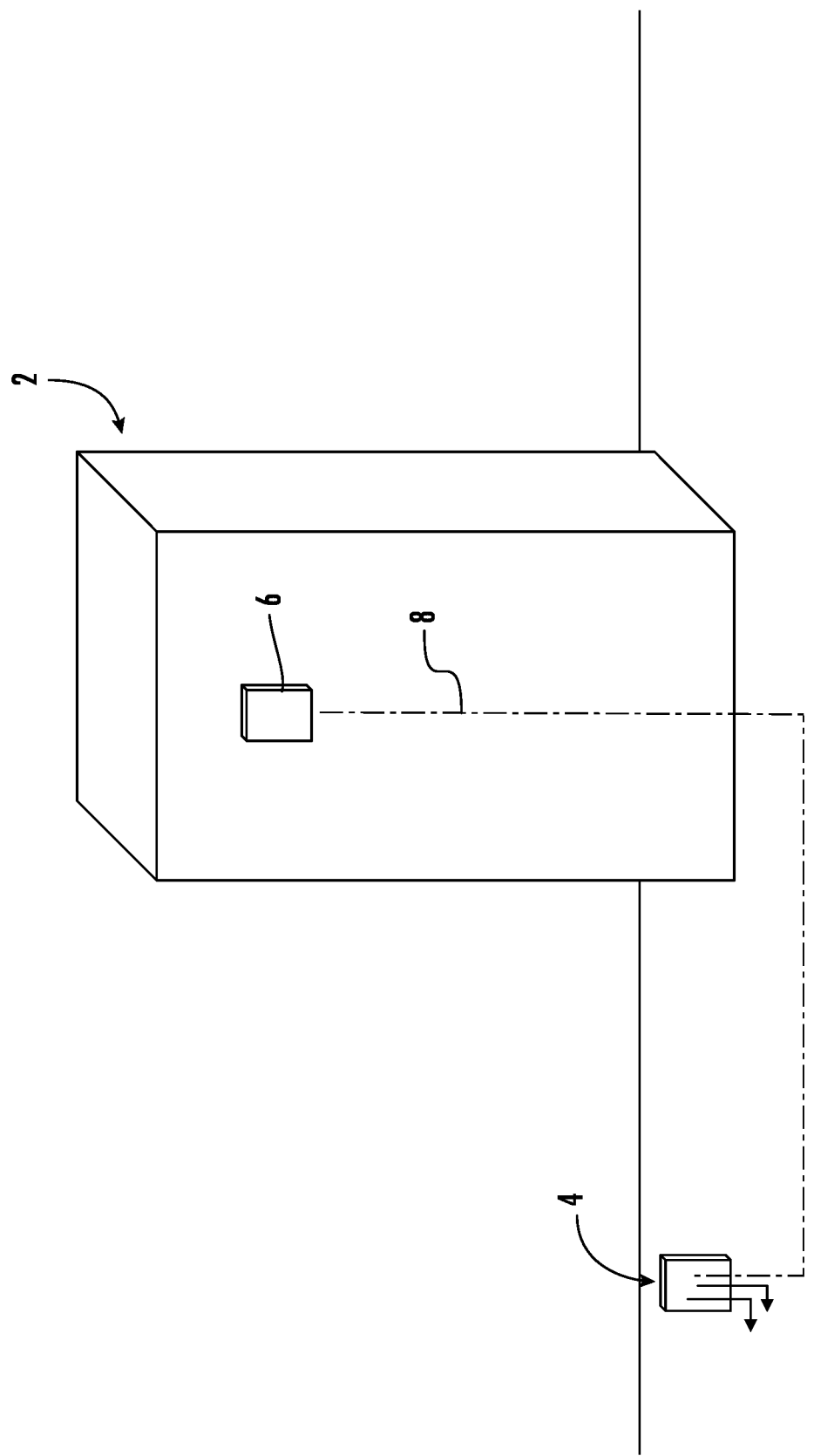
Figure 2:
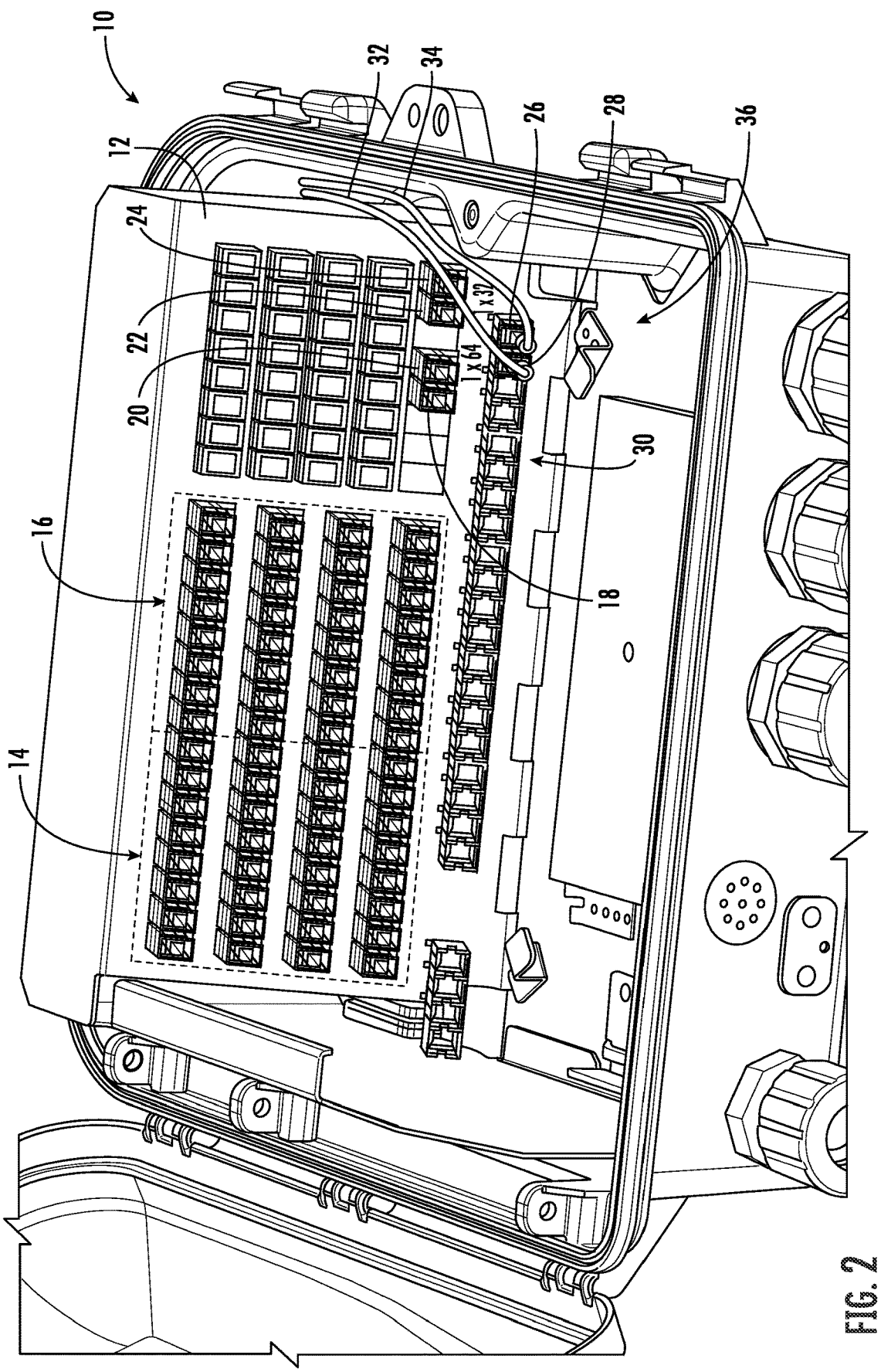
Figure 3:
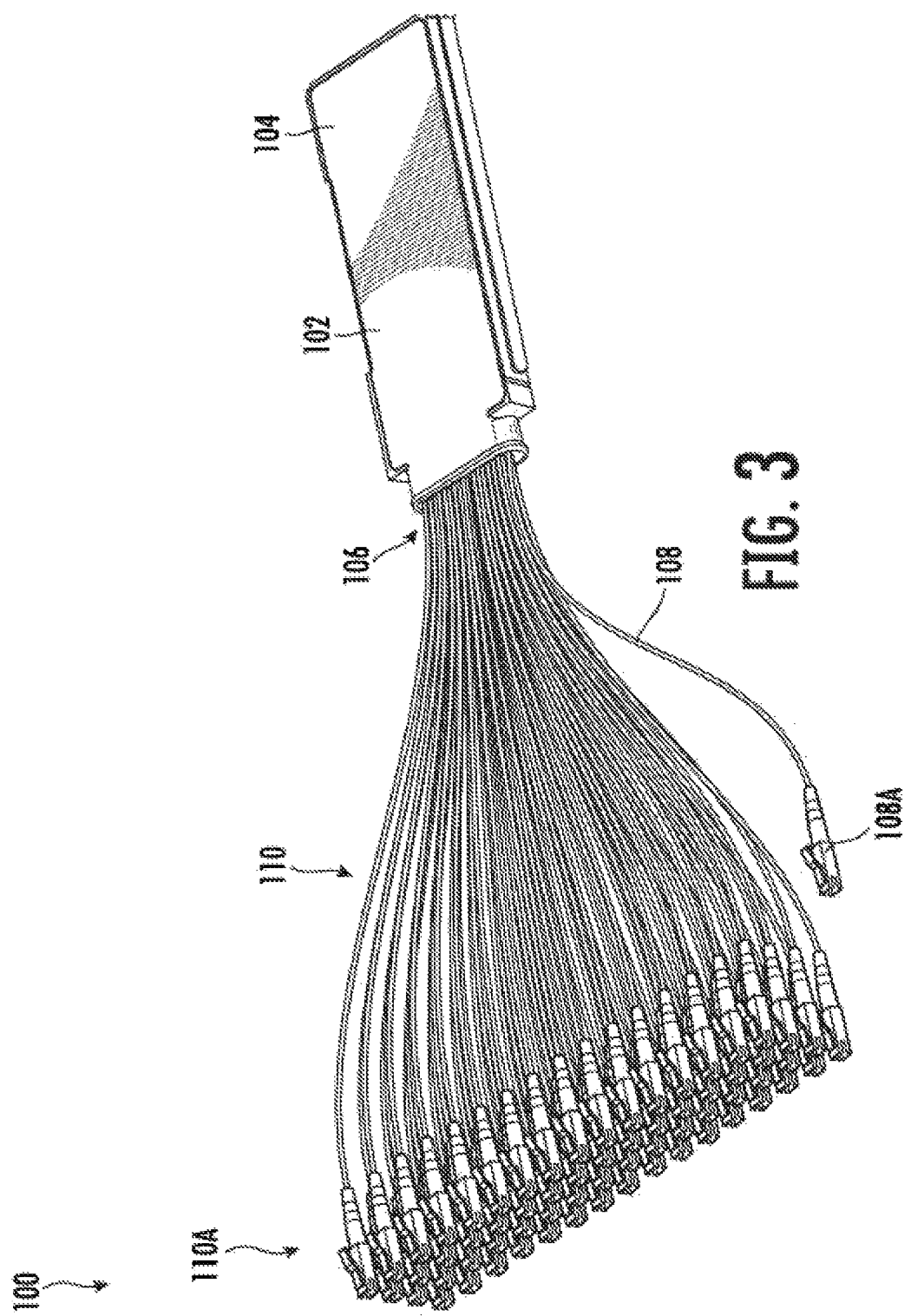
Figure 4:
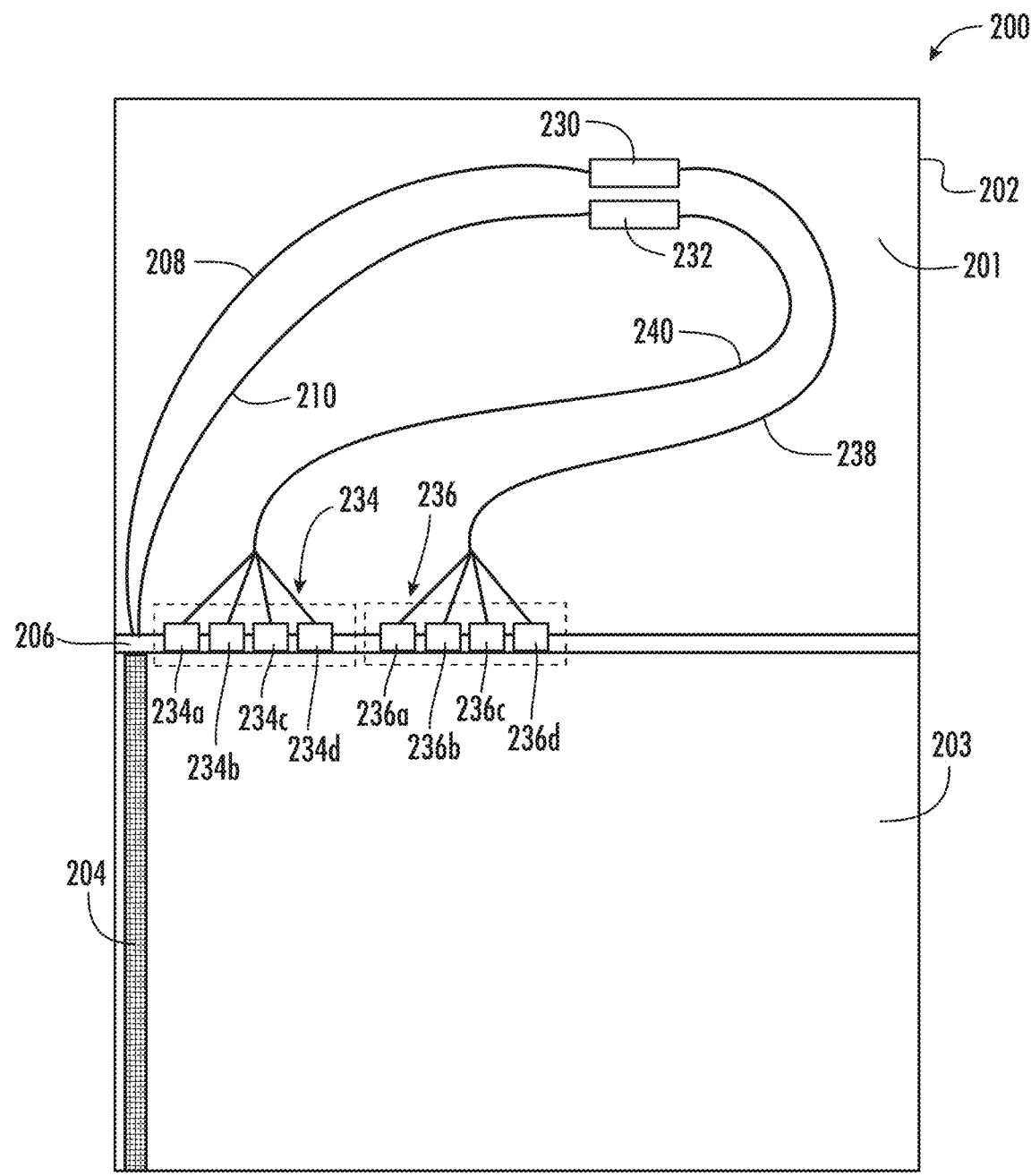
Figure 5:
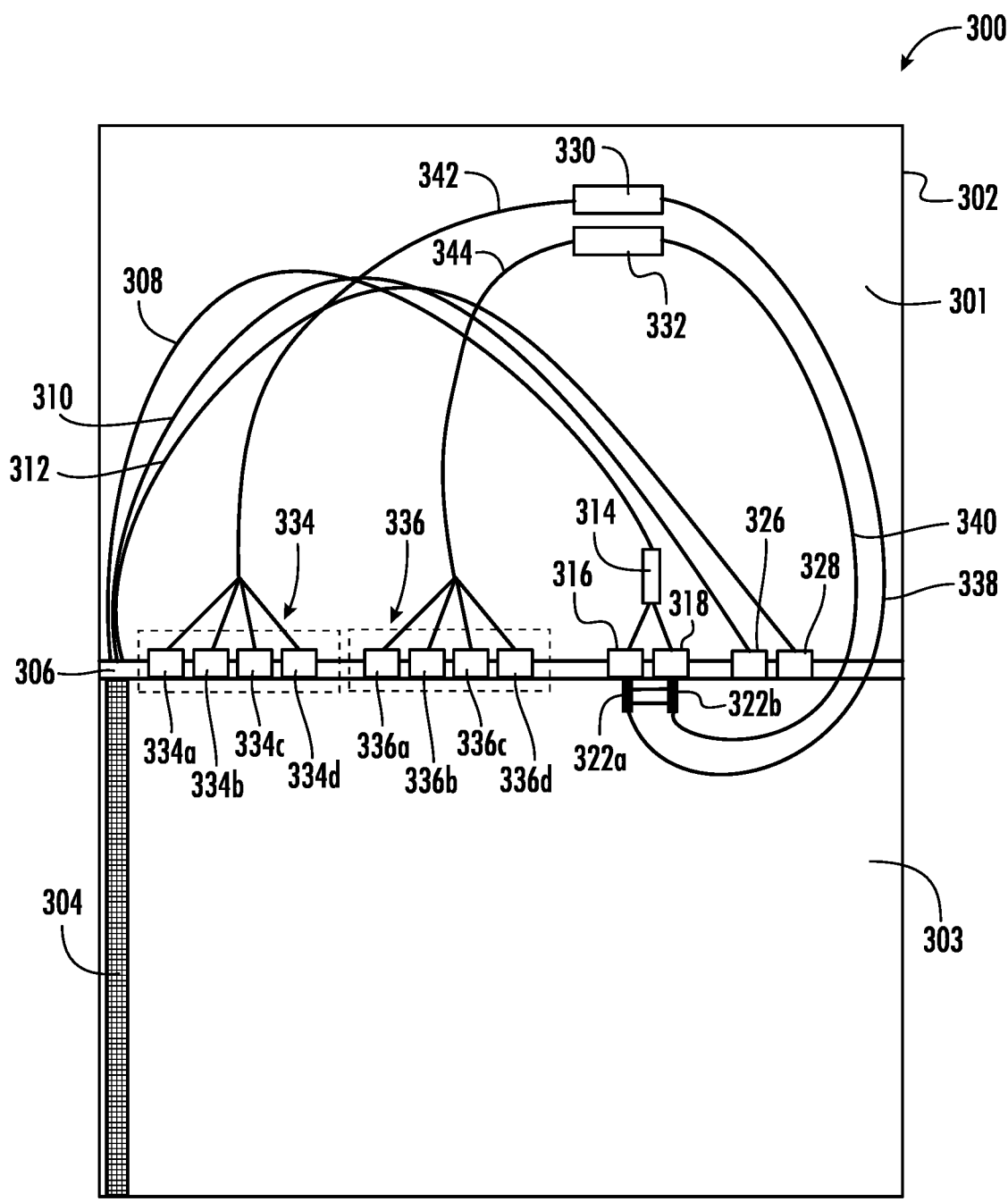
Figure 6:
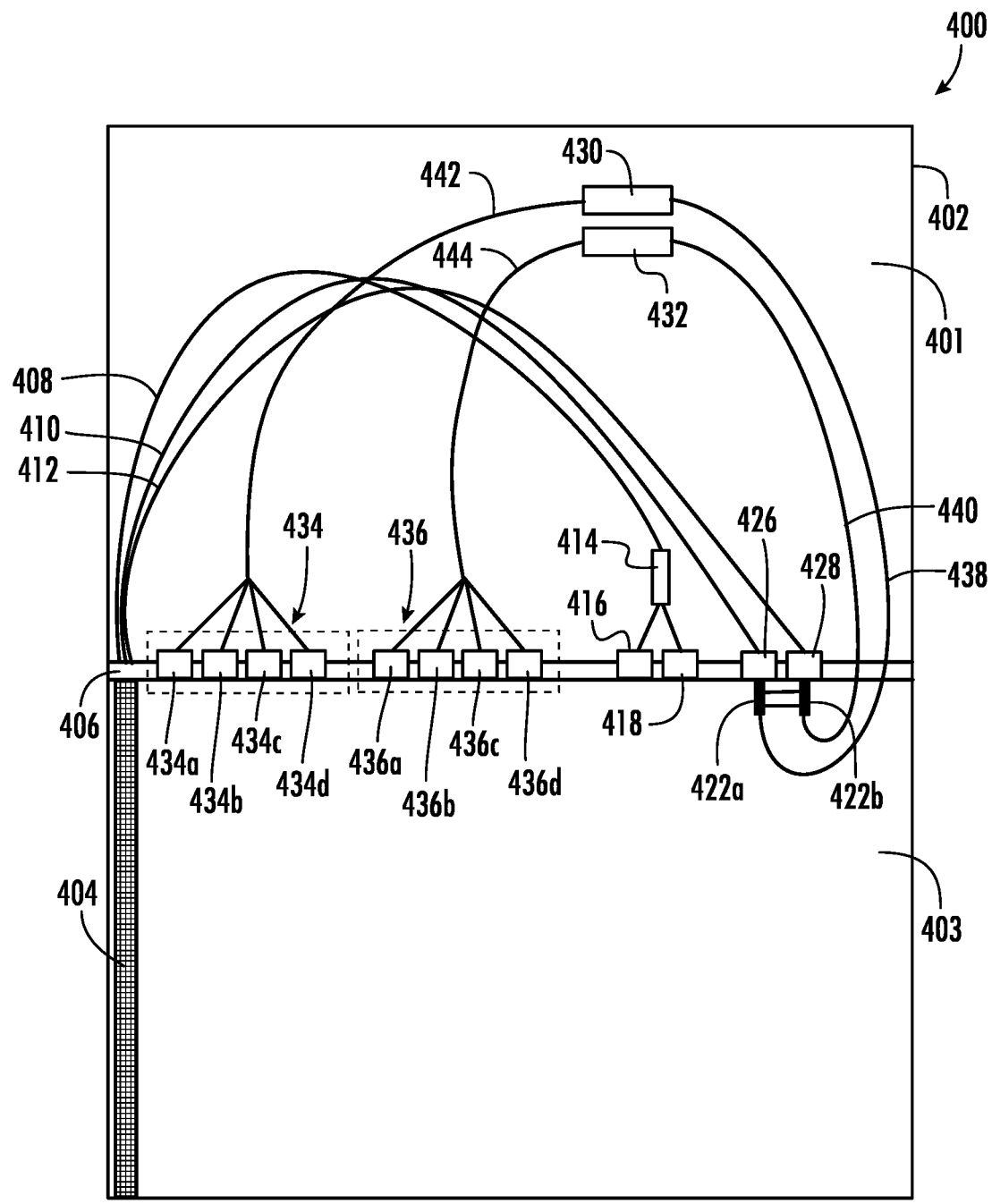
Figure 7:
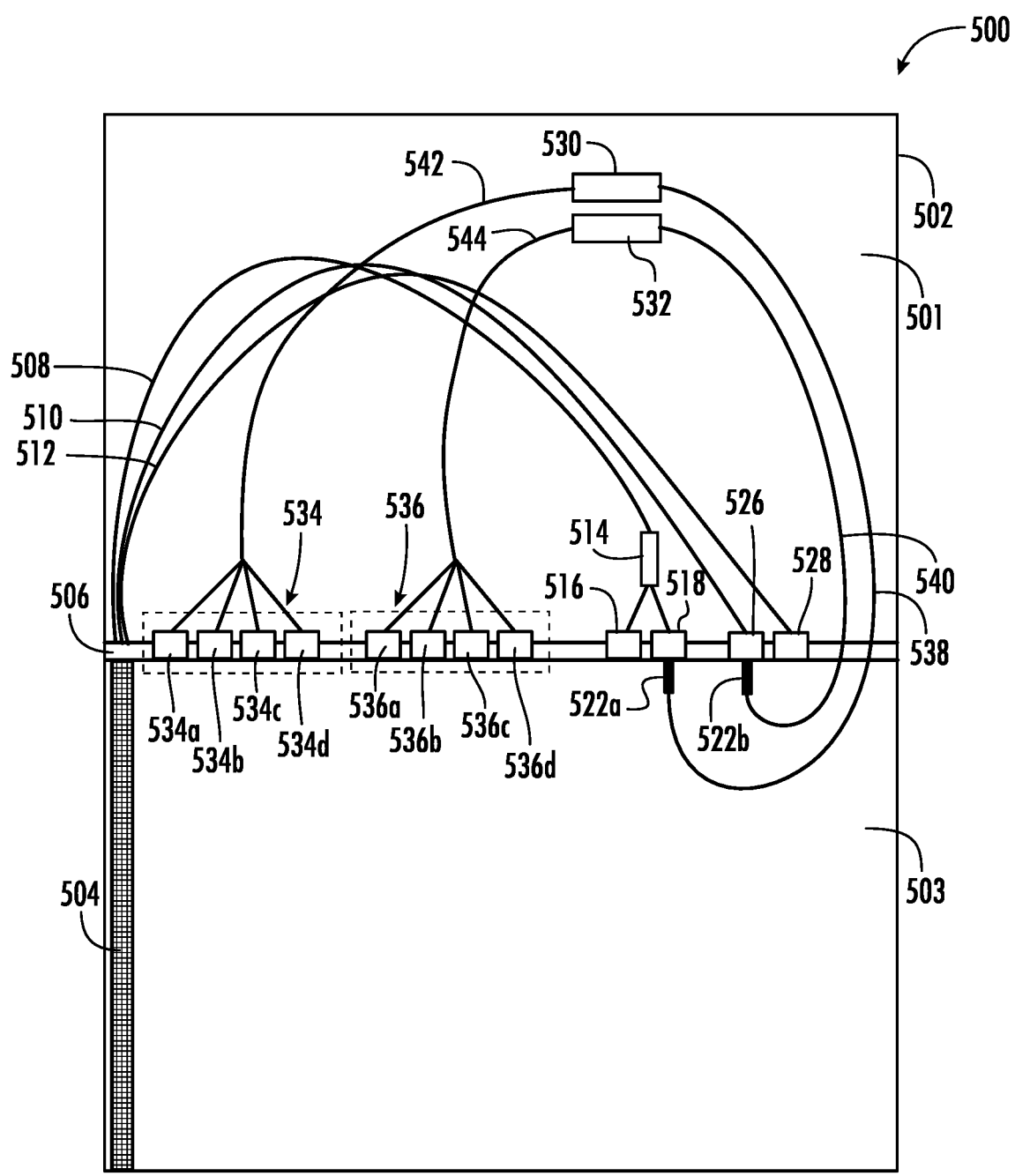
Figure 8:
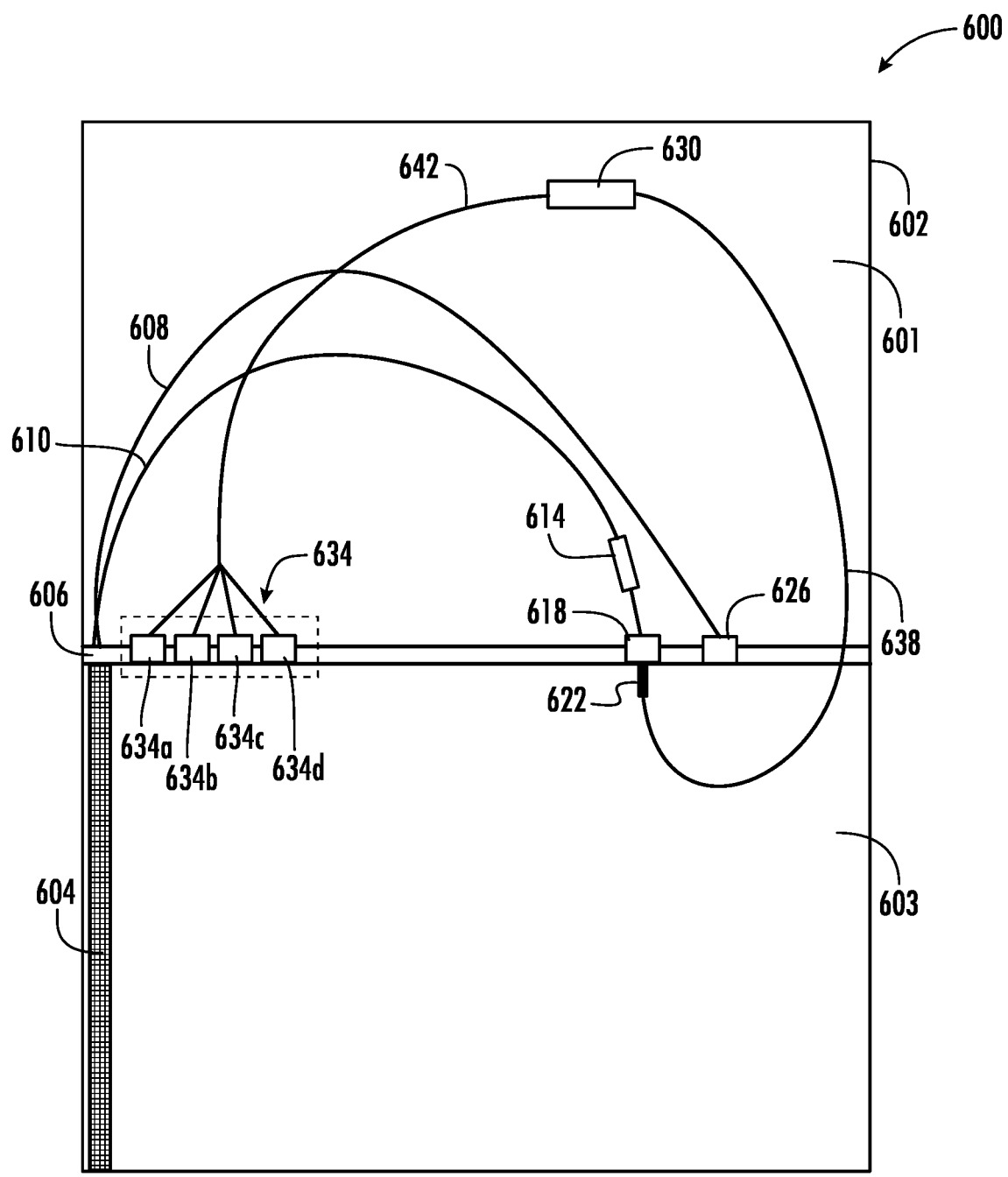
Figure 9:
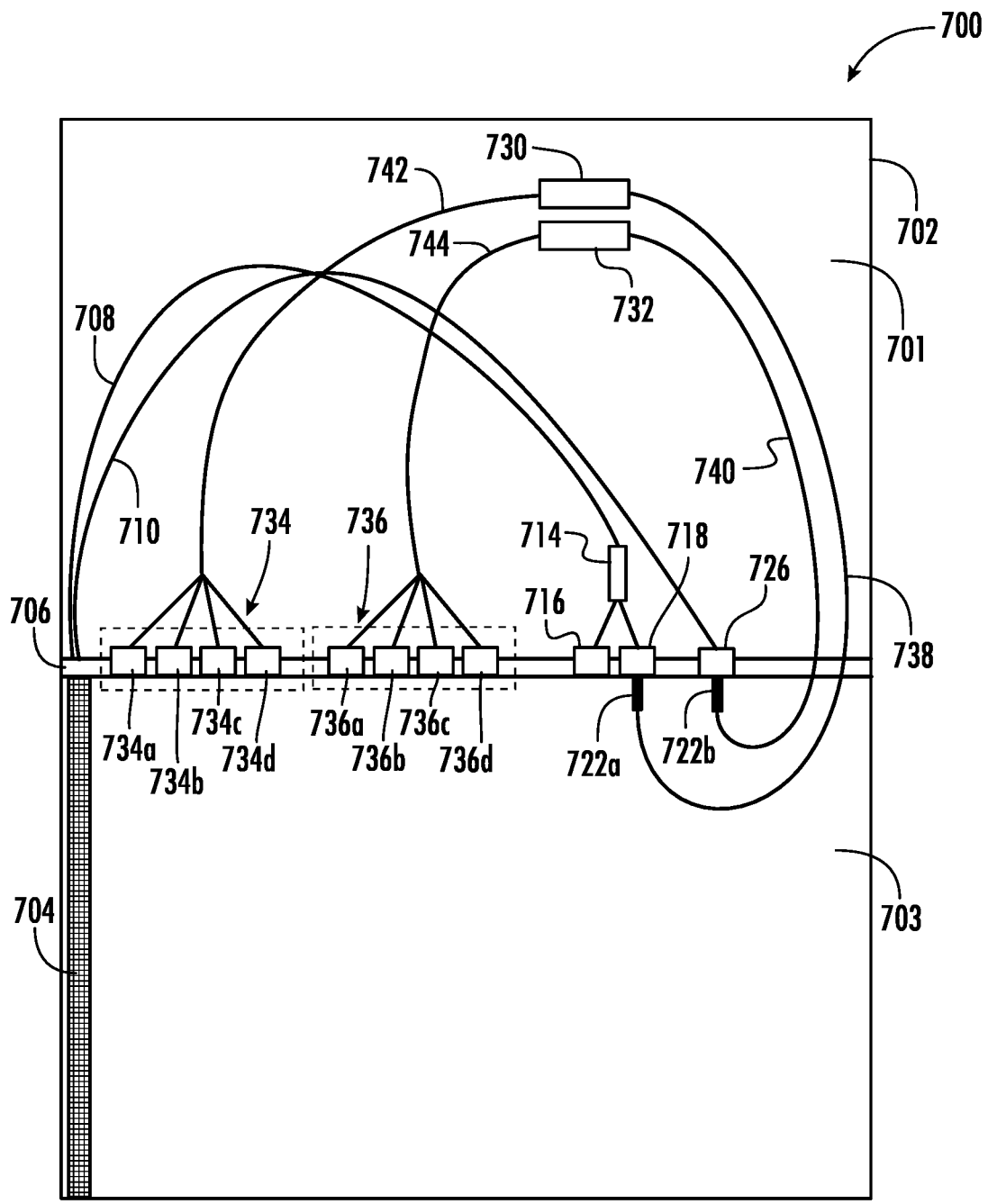
Figure 10:
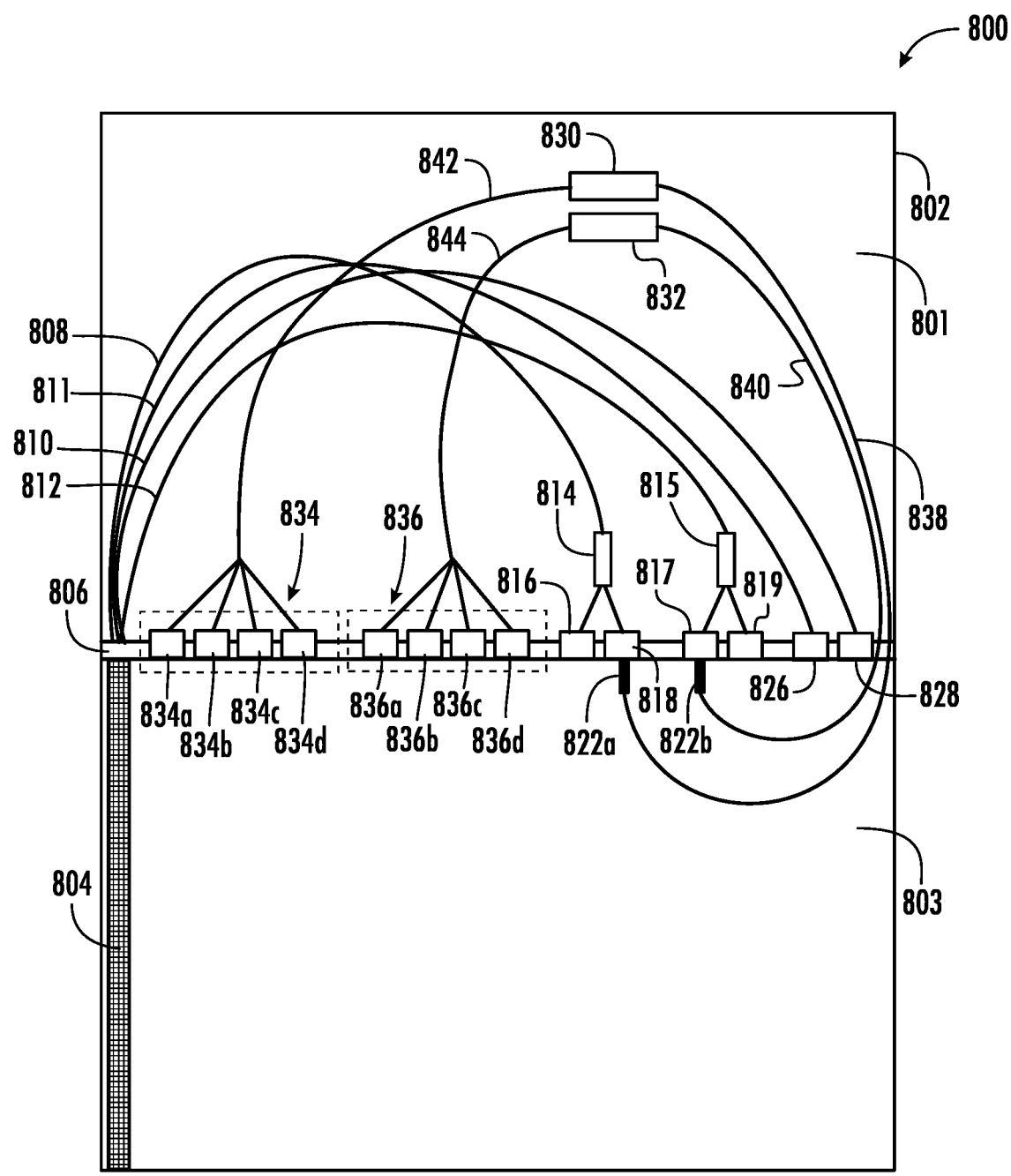
Figure 11:
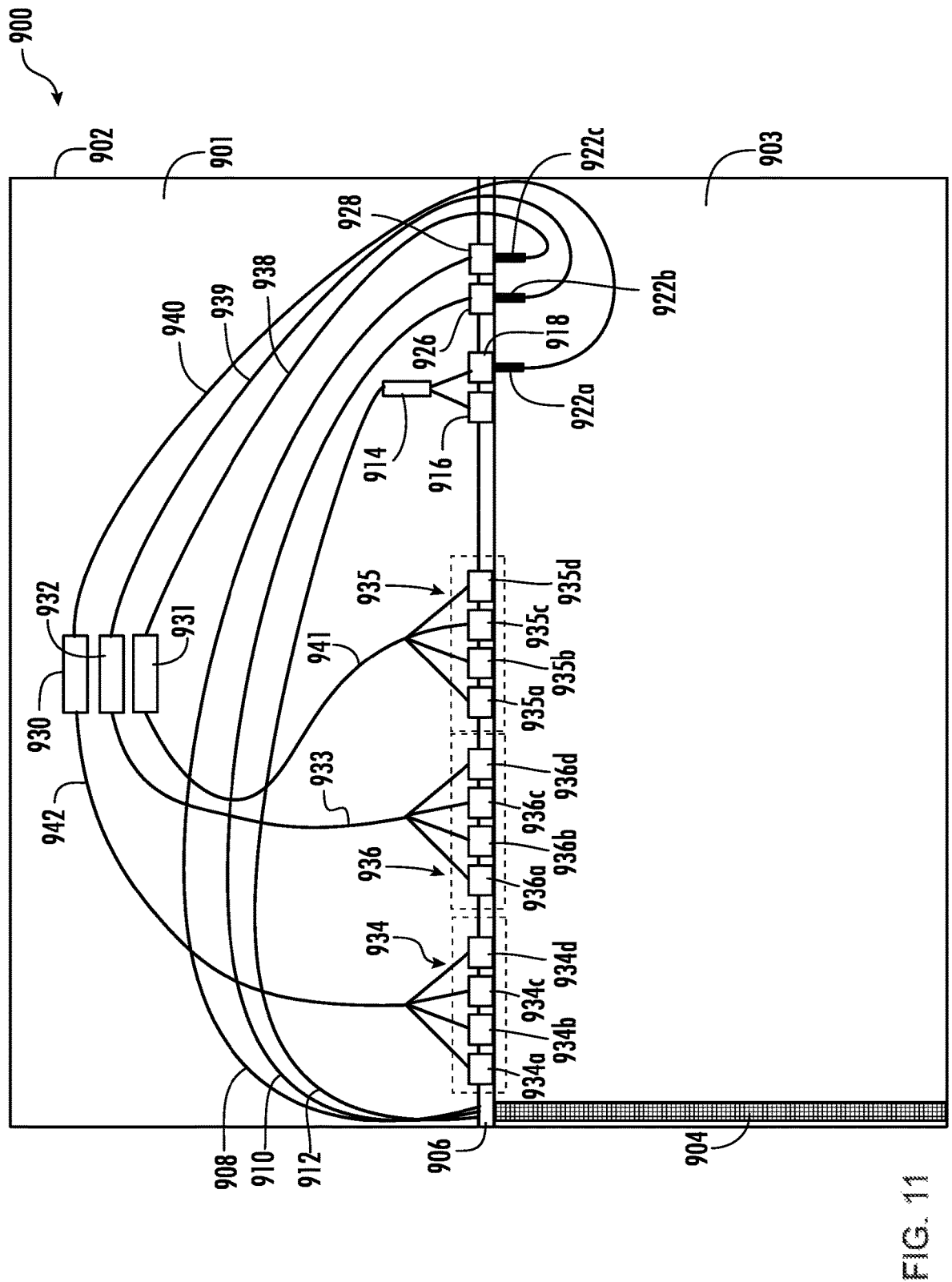
Figure 12:
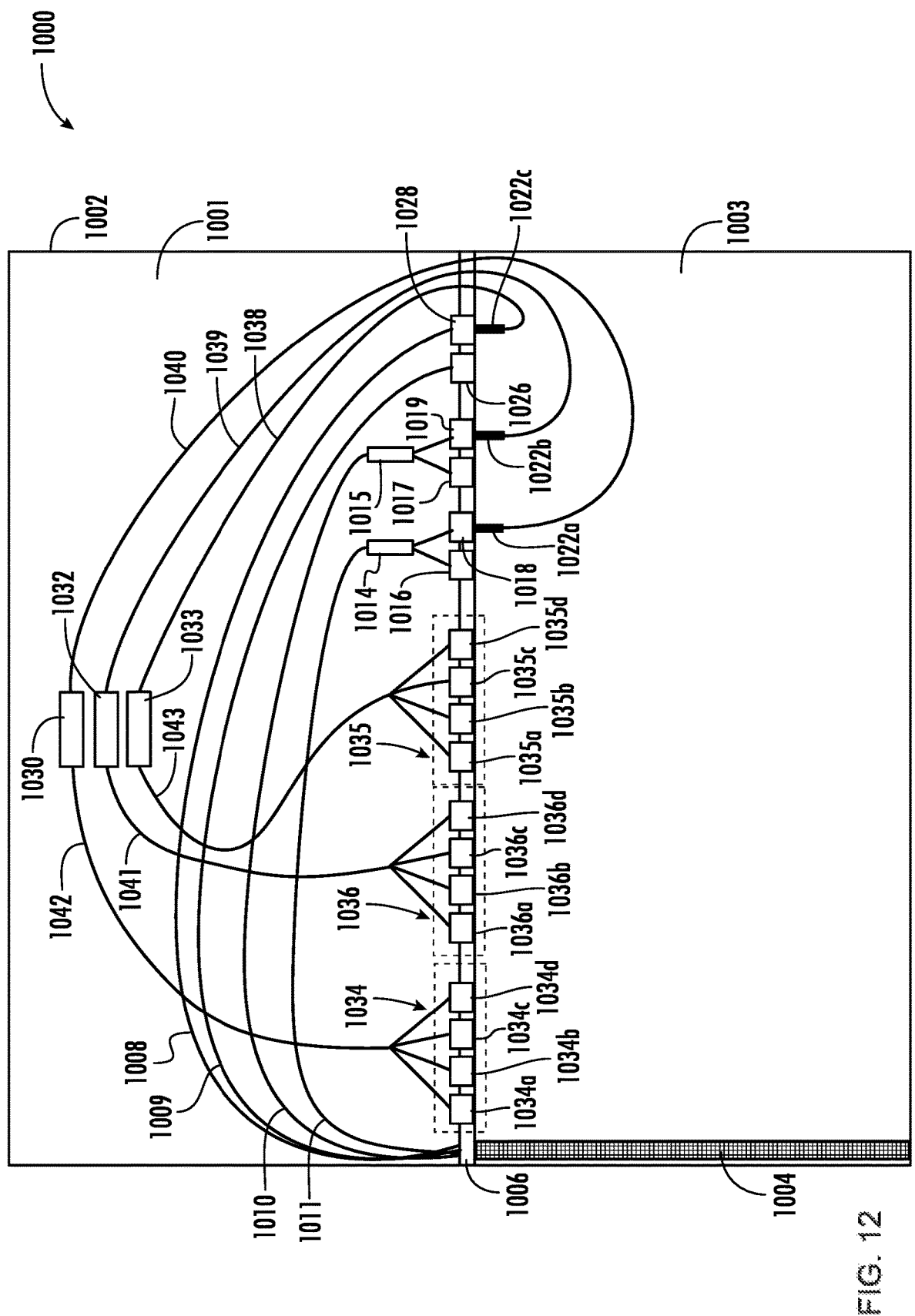
Figure 13:
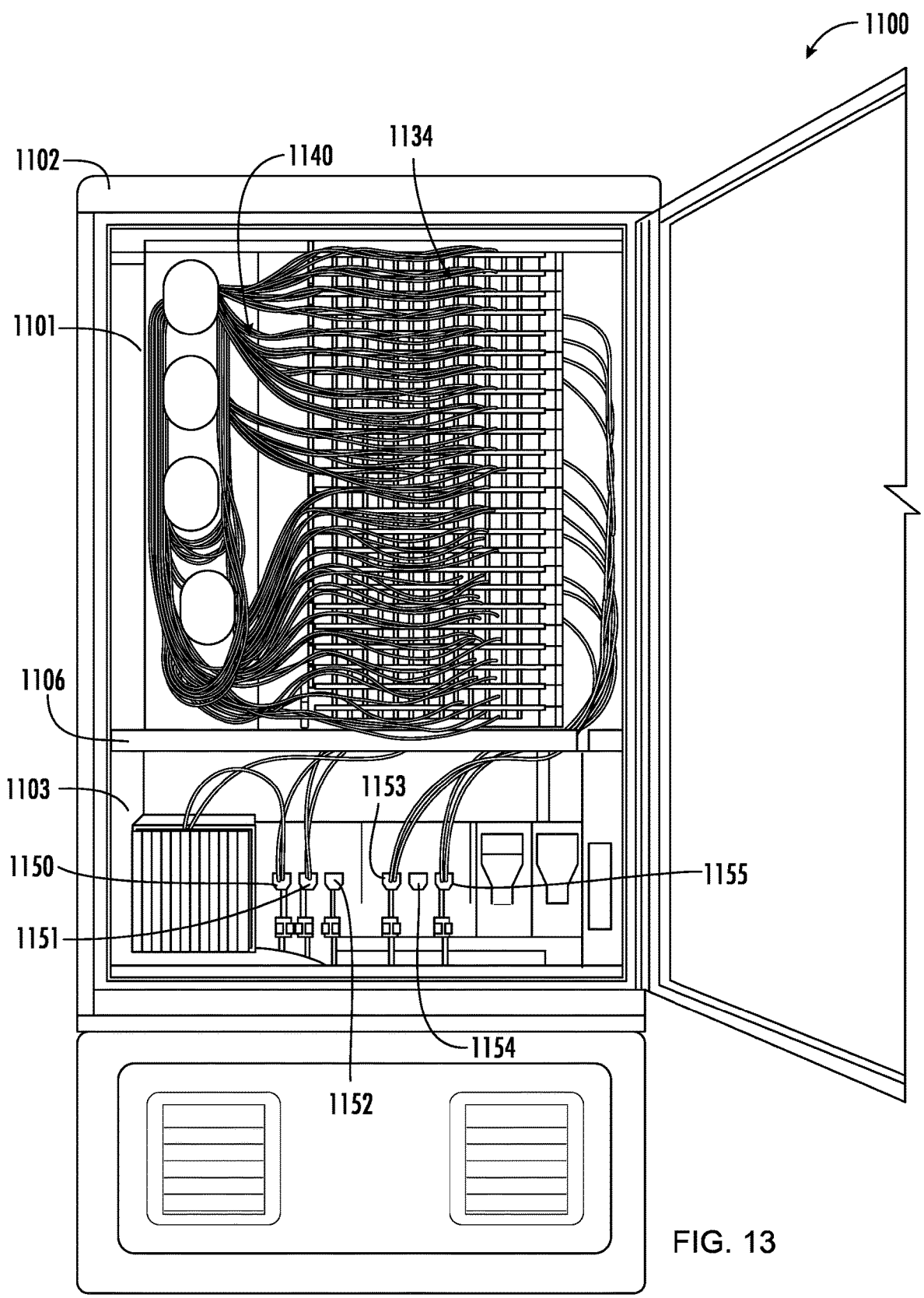
Figure 14:
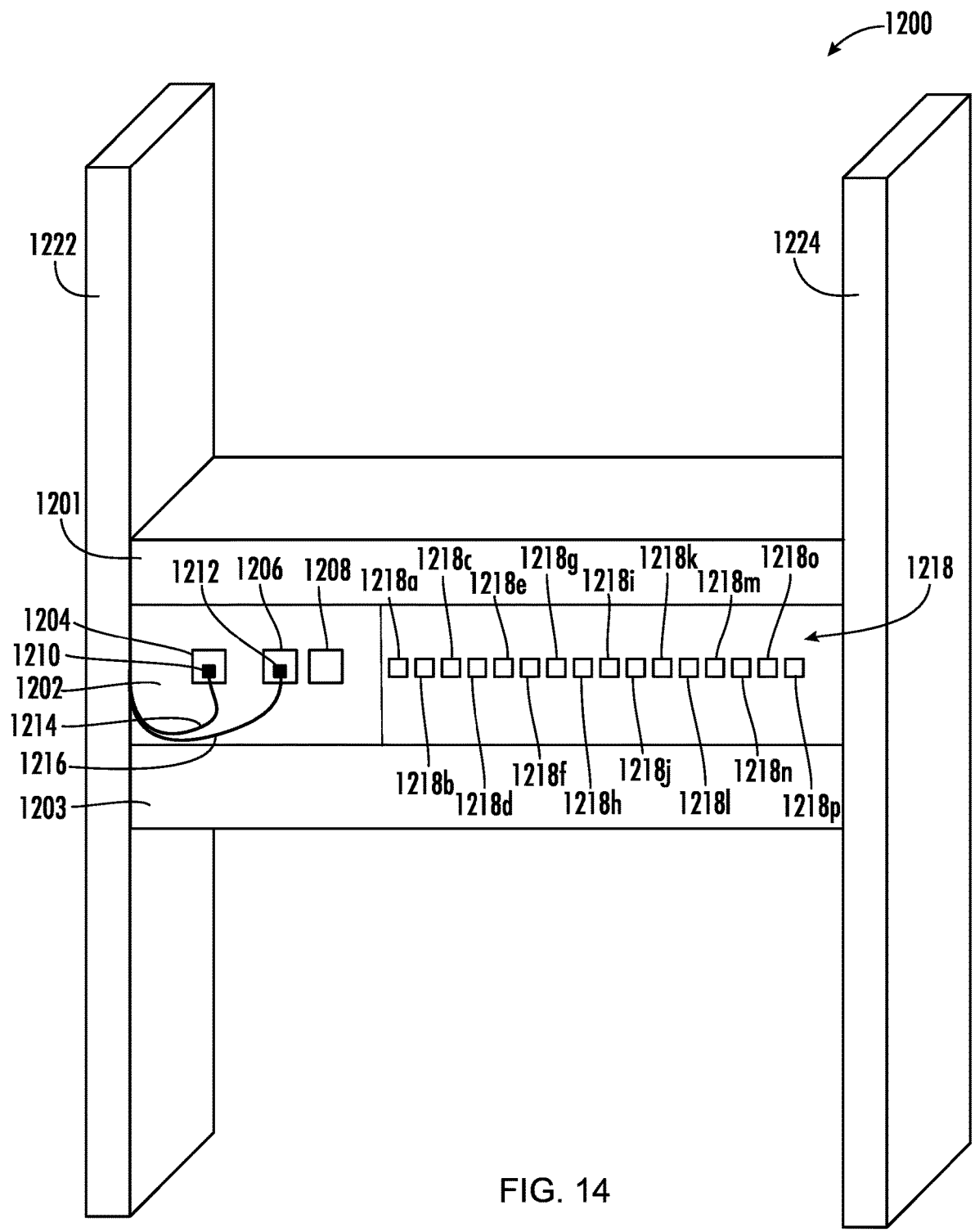
Figure 15:
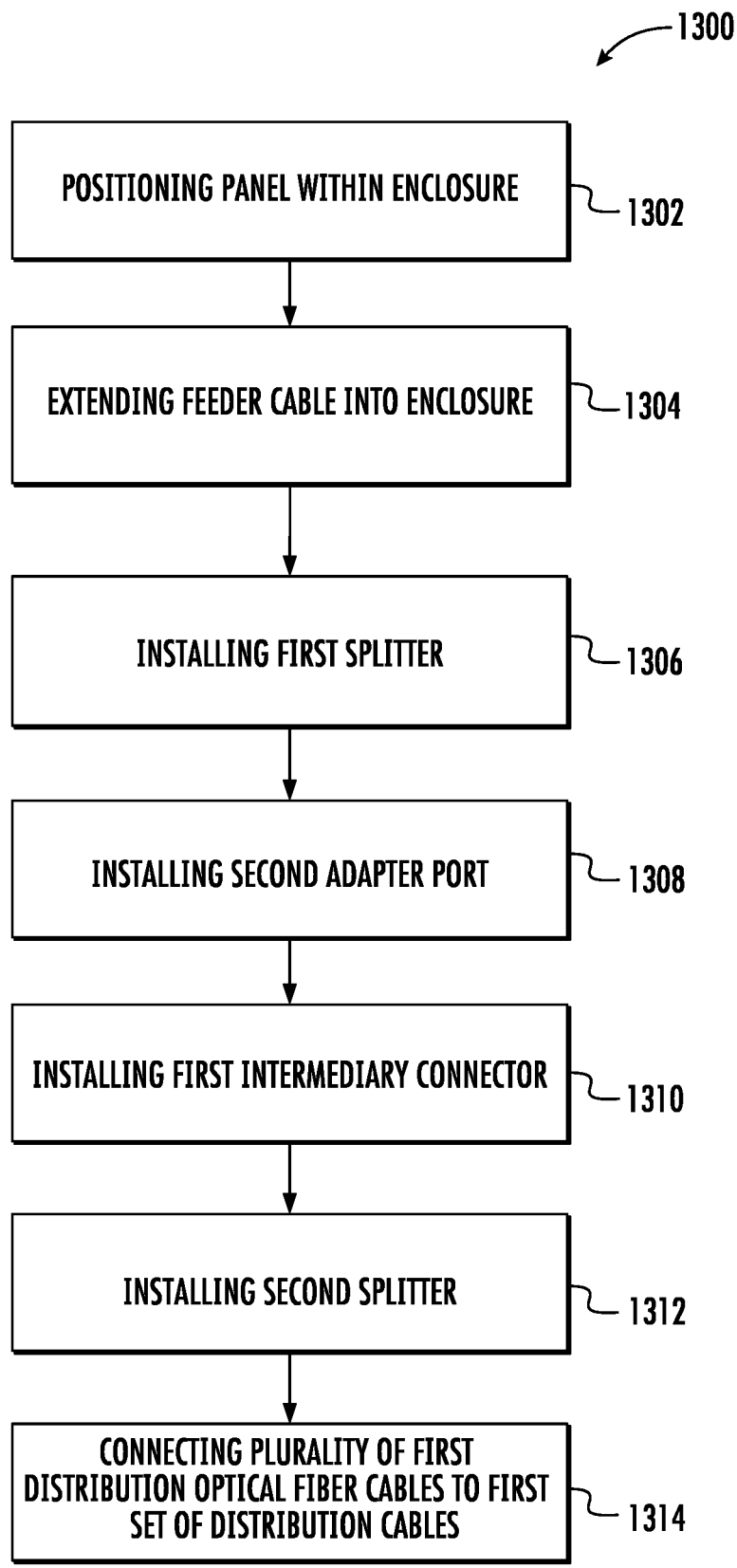

Having thus described embodiments of the present disclosure in general terms, reference will now be made to the accompanying drawings, which are not necessarily drawn to scale, and wherein:

FIG. 1 illustrates an example system for providing network traffic through a fiber optic backbone to a building, in accordance with some embodiments discussed herein;

FIG. 2 illustrates a perspective view of an example panel of an example communications equipment cabinet assembly, in accordance with some embodiments discussed herein;

FIG. 3 illustrates a perspective view of an example splitter, in accordance with some embodiments discussed herein;

FIG. 4 illustrates a schematic cross-sectional view of an example communications equipment cabinet assembly including example splitter devices configured to provide fixed splitter ratio outputs for distribution ports, in accordance with some embodiments discussed herein;

FIG. 5 illustrates a schematic cross-sectional view of an example communications equipment cabinet assembly including example splitter devices configured to provide selectable splitter ratio outputs for distribution ports, in accordance with some embodiments discussed herein;

FIG. 6 illustrates a schematic cross-sectional view of another example communications equipment cabinet assembly shown with an intermediary connector connected to different adapter ports so as to define a different splitter ratio output for the distribution ports relative to FIG. 5, in accordance with some embodiments discussed herein;

FIG. 7 illustrates a schematic cross-sectional view of another example communications equipment cabinet assembly, where an intermediary connector is separated into two different intermediary connectors, enabling connection into different adapter ports to define two different splitter ratio outputs, one for each set of distribution ports, in accordance with some embodiments discussed herein;

FIG. 8 illustrates a schematic cross-sectional view of another example communications equipment cabinet assembly shown with one intermediary connector that is connectable to two different adapter ports so as to enable different splitter ratio outputs for a set of distribution ports, in accordance with some embodiments discussed herein;

FIG. 9 illustrates a schematic cross-sectional view of another example communications equipment cabinet assembly shown with two intermediary connectors that are each connectable to any of three different adapter ports so as to enable different splitter ratio outputs for a plurality of distribution ports, in accordance with some embodiments discussed herein;

FIG. 10 illustrates a schematic cross-sectional view of another example communications equipment cabinet assembly shown with two intermediary connectors that are each connectable to any of six different adapter ports so as to enable different splitter ratio outputs for two different sets of distribution ports, in accordance with some embodiments discussed herein;

FIG. 11 illustrates a schematic cross-sectional view of another example communications equipment cabinet assembly shown with three intermediary connectors that are each connectable to any of four different adapter ports so as to enable different splitter ratio outputs for three different sets of distribution ports, in accordance with some embodiments discussed herein;

FIG. 12 illustrates a schematic cross-sectional view of another example communications equipment cabinet assembly shown with three intermediary connectors that are each connectable to any of six different adapter ports so as to enable different splitter ratio outputs for three different sets of distribution ports, in accordance with some embodiments discussed herein;

FIG. 13 illustrates an example communications equipment cabinet assembly with a plurality of distribution ports and six different adapter ports, in accordance with some embodiments discussed herein;

FIG. 14 illustrates an example rack assembly with a tray containing a plurality of distribution ports and three different adapter ports that are each connectable to either one of two intermediary connectors, in accordance with some embodiments discussed herein; and FIG. 15 illustrates a flowchart for an example method of manufacturing an enclosure configured for selectively defining optical fiber splitter ratio outputs, in accordance with some embodiments discussed herein.

DETAILED DESCRIPTION

Exemplary embodiments of the present disclosure will be described more fully hereinafter with reference to the accompanying drawings, in which some, but not all embodiments of the present disclosure are shown. Indeed, the present disclosure may be embodied in many different forms and should not be construed as limited to the exemplary embodiments set forth herein; rather, these embodiments are provided so that this disclosure will satisfy applicable legal requirements. Like reference numerals refer to like elements throughout.

Due in part to its extremely wide bandwidth and low noise operation, optical fiber is increasingly being used for a variety of applications, including but not limited to broadband voice, video, and data transmission. Fiber optic communications networks may include a number of interconnection points (such as at which multiple optical fibers are interconnected) and/or connection terminals (e.g., network access point (NAP) enclosures, optical network terminals (ONTs), network interface devices (NIDs)). Connection terminals may include ports and be used to establish optical connections between optical fibers terminated from the distribution cable and respective optical fibers of drop cables, extended distribution cables, tether cables, and/or branch cables.

The connection terminals may be used to extend fiber optic communications services to a subscriber. In this regard, fiber optic networks may deliver "fiber-to-the-curb" (FTTC), "fiber-to-the-business" (FTTB), "fiber-to-the-home" (FTTH) and "fiber-to-the-premises" (FTTP), referred to generically as "FTTx". For example, delivering services to subscribers in the last mile connection may occur indoors. Different kinds of buildings may require complicated systems, which can include many separated optical fibers, each one connecting one subscriber. Installation may include making each of the many separated optical fibers connect between a main distribution point (e.g., in the basement or elsewhere in the building) and the end user. Each connection may require a certain splitter ratio output, so the enclosure may include specific wiring patterns to cause the output port to have desired transmission loads.

Assemblies and systems according to the present disclosure allow an installer to configure fibers and/or other communications equipment in an improved manner, such as by enabling the installer to easily adjust splitter ratio outputs of distribution ports. In this regard, various example assemblies and systems described herein may be able to easily switch between different splitter ratio outputs and/or utilize multiple splitter ratio outputs at once. Indeed, in some embodiments, such a change may occur even without disconnecting any downstream devices that are connected into the distribution ports.

Various described systems and assemblies provide for improved compliance by installers (including, novice installers) by offering a simple method of organizing and connecting fibers within the interior of communications equipment cabinets or other enclosures. This can prevent or limit signal loss as well as protect the integrity of the entire network.

While some of the illustrated and described embodiments focus on use of various embodiments in terminals, any type of enclosure or optical fiber management device is contemplated for use with various embodiments. For example, selectable splitter ratio outputs for downstream distribution ports may be usefully employed in many different fiber optic management scenarios, such as in fiber distribution hub cabinets, multi-dwelling unit cabinets, front-end and/or back-end cabinets, closures, or other terminals. In some embodiments, various concepts and designs may be easily adjusted for any communications equipment, such as for use within racks, among other communications equipment.

FIG. 1 illustrates an example fiber distribution system 2, which may be installed within a communications architecture (e.g., building network). The system 2 may include a headend unit 4 configured to combine various network inputs into a single fiber optic backbone 8 that leads to an enclosure 6. By combining all of the communications network signals onto a single fiber optic backbone 8, the system 2 may save on materials and installation costs. In some embodiments, the fiber optic backbone 8 is a central fiber pathway run through the network that enables multiple fiber optic assembly units to be connected thereto, although, in some embodiments, various branches of a central fiber pathway can also be utilized downstream of the headend unit 4.

FIG. 2 is a perspective view of an example enclosure 10 offering selectable splitter ratio outputs for distribution ports. The enclosure 10 includes a panel 12 that hides a fiber management portion (e.g., similar to fiber management portion 301 in FIG. 5), while exposing various ports to an installer portion 36. FIG. 2 shows an example first set of distribution ports 14 (on the left) as being 32 distribution ports. Similarly, FIG. 2 also shows an example second set of distribution ports 16 (to the right of the first set of distribution ports 14) as being 32 distribution ports. It should be appreciated that the first set of distribution ports 14 and second set of distribution ports 16 could be any other number of distribution ports in other embodiments. The first set of distribution ports 14 and the second set of distribution ports 16 are available in the installer portion 36 for a user to connect downstream installation optical fibers. FIG. 2 also shows example split adapter ports (e.g., a first split adapter port 18 and a second split adapter port 20), as well as adapter ports (e.g., a first adapter port 22 and a second adapter port 24). Two example intermediary connectors (e.g., a first intermediary connector 26 and a second intermediary connector 28) are illustrated as "parked" in the parking docks 30 and ready for connection into one of the adapter ports (e.g., the first split adapter port 18, the second split adapter port 20, the first adapter port 22, or the second adapter port 24) for selectively defining the splitter ratio outputs of the first set of distribution ports 14 and the second set of distribution ports 16, respectively. The first intermediary connector 26 is connected to a first intermediary optical fiber 34 and the second intermediary connector 28 is connected to a second intermediary optical fiber 32, which both lead around the panel 12 into the fiber management portion. As will be described in more detail herein, the first intermediary optical fiber 34 and the second intermediary optical fiber 32 are each configured within the fiber management portion (not shown) to eventually connect with a respective set of distribution ports (e.g., the first set of distribution ports 14 and the second set of distribution ports 16). Accordingly, an installer may select the desired splitter ratio outputs for the first set of distribution ports 14 and the second set of distribution ports 16 and may simply connect a corresponding one of the intermediary connectors in the desired adapter port(s). In the illustrated embodiment, labels showing the resulting splitter ratio outputs (e.g., 1×64 and 1×32) are provided for ease of use.

FIG. 3 shows an example splitter 100, such as may be used in various embodiments described herein. The splitter 100 includes a module 102, and the module 102 of the splitter 100 may include a housing 104 having a volume for holding fiber management equipment for causing an output split of an incoming fiber optic 108 (which is illustrated with a connector 108A) into a plurality of distribution fibers 110. The module 102 of the splitter 100 also includes an exit cavity 106, and the exit cavity 106 allows the plurality of distribution optical fibers 110 to extend from the module 102 of the splitter 100. The plurality of distribution optical fibers 110 may include connectors 110A at an end of each of the plurality of distribution optical fibers 110.

Because the splitter 100 includes 64 distribution optical fibers 110, the splitter 100 is a 1×64 splitter. In some embodiments, splitters described herein may be similar or identical to the splitter 100 shown in FIG. 3. In other embodiments, however, the splitters described herein may be configured differently. For example, a splitter may have more or less distribution optical fibers (e.g., a splitter may have 32 distribution optical fibers, 128 distribution optical fibers, or any other number of distribution optical fibers). Notably, the purpose of the splitter (e.g., the splitter 100) is to distribute a consolidated optical fiber into multiple output optical fibers, as will be exemplified and further described herein.

FIG. 4 illustrates an example communications equipment cabinet assembly 200 including an enclosure 202 with a panel 206. The panel 206 splits the enclosure 202 into an installer portion 203 and a fiber management portion 201. The division of the enclosure 202 into the installer portion 203 and the fiber management portion 201 allows for a manufacturer or owner to allow access to the installer portion 203 while keeping the fiber management portion 201 protected (e.g., locked or difficult to gain entry to). This may be desirable, for example, in situations in which a less-experienced technician needs to make a change within the installer portion 203, and the technician is not experienced enough to be trusted with access to the fiber management portion 201.

Still referring to FIG. 4, a feeder cable 204 enters the enclosure 202 from the bottom of the enclosure 202 within the installer portion 203. In other embodiments, however, the feeder cable 204 may enter the enclosure 202 from any other position (including, e.g., from the top of the enclosure 202 within the fiber management portion 201). The feeder cable 204 is, in some embodiments, a casing comprising multiple smaller cables and/or optical fibers. Multiple fibers such as, but not limited to, a first main optical fiber 208 and a second main optical fiber 210, are fed into the fiber management portion 201 from the feeder cable 204 (notably, in some embodiments, many additional main optical fibers may be included within the feeder cable 204).

FIG. 4 illustrates a typical cabinet assembly, in which the main optical fibers such as the first main optical fiber 208 and the second main optical fiber 210 are connected directly to a first splitter 230 and a second splitter 232, respectively, which causes a first set of distribution ports 234 and a second set of distribution ports 236 to have a fixed splitter ratio output. In contrast, the embodiment shown in FIG. 5, however, provides two sets of adapter ports that allow a user to easily adjust the splitter ratio output for the available sets of distribution ports.

FIG. 5 illustrates an example communications equipment cabinet assembly 300 including an enclosure 302 with a panel 306 (which may for example represent the enclosure 10 and panel 12 (and corresponding equipment therein) shown and described with respect to FIG. 2). The panel 306 splits the enclosure 302 into an installer portion 303 and a fiber management portion 301. The division of the enclosure 302 into the installer portion 303 and the fiber management portion 301 allows for a manufacturer or owner to allow access to the installer portion 303 while keeping the fiber management portion 301 protected (e.g., locked or difficult to gain entry to). This may be desirable, for example, in situations in which a less-experienced technician needs to make a change within the installer portion 303, and the technician is not experienced enough to be trusted with access to the fiber management portion 301.

A feeder cable 304 enters the enclosure 302 from the bottom of the enclosure 302 within the installer portion 303. In other embodiments, however, the feeder cable 304 may enter the enclosure 302 from any other position (including, e.g., from the top of the enclosure 302 within the fiber management portion 301). The feeder cable 304 is, in some embodiments, a casing comprising multiple smaller cables and/or optical fibers. Multiple optical fibers such as, but not limited to, a first main optical fiber 308, a second main optical fiber 310, and a third main optical fiber 312 are fed into the fiber management portion 301 from the feeder cable 304 (notably, in some embodiments, many additional main optical fibers may be included within the feeder cable 304).

Still referring to FIG. 5, a first splitter 314 is positioned within the fiber management portion 301 between the first main optical fiber 308 and a first split adapter port 316 and a second split adapter port 318. The first splitter 314 is configured to split the first main optical fiber 308 into a plurality of secondary optical fibers that are each connected to one of the first split adapter port 316 and the second split adapter port 318 extending from the panel 306 and accessible for connection from the installer portion 303. The first splitter 314 may, for example, be configured similar to the splitter 100 shown in FIG. 3. Notably, the illustrated first splitter 314 is a 1×2 splitter, but other splitter ratios are contemplated (such as 1×4, 1×8, 1×16, 1×32, 1×64, etc.). In some such embodiments, however, each split will link in a 1 to 1 ratio to a corresponding adapter port. Adjusting the splitter ratio of the first splitter 314 and the number of adapter ports adjusts the optional splitter ratio outputs selectively available—which is contemplated by various embodiments of the present invention.

Next, the second main optical fiber 310 is connected to a second adapter port 326 positioned in the panel 306 and accessible for connection from the installer portion 303. Similarly, the third main optical fiber 312 is connected to a third adapter port 328 positioned in the panel 306 and accessible for connection from the installer portion 303.

Still referring to the embodiment shown in FIG. 5, a first intermediary connector 322a and a second intermediary connector 322b are connected together and plugged into the first split adapter port 316 and the second split adapter port 318, respectively. The first intermediary connector 322a is connected to a first intermediary optical fiber 338 that leads around and/or through the panel 306 and into the fiber management portion 301. The first intermediary connector 322a is accessible in the installer portion 303. The first intermediary optical fiber 338 is then connected to a second splitter 330. The second splitter 330 is configured to split the first intermediary optical fiber 338 into a plurality of first distribution optical fibers 342 that are each connected to one of a first set of distribution ports 334 positioned in the panel 306 and accessible for connection from the installer portion 303. For example, FIG. 5 shows a first distribution port 334a, a second distribution port 334b, a third distribution port 334c, and a fourth distribution port 334d of the first set of distribution ports 334. In some embodiments, the first set of distribution ports 334 may include 32 distribution ports (such as shown in FIG. 2). In other embodiments, however, the first set of distribution ports 334 may include more or less than 32 distribution ports. Notably, the second splitter 330 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the second splitter 330 and the number of distribution ports adjusts the optional splitter ratio outputs selectively available—which is contemplated by various embodiments of the present invention.

Similarly, the second intermediary connector 322b is connected to a second intermediary optical fiber 340 that leads around and/or through the panel 306 and into the fiber management portion 301. The second intermediary connector 322b is also accessible in the installer portion 303. The second intermediary optical fiber 340 is then connected to a third splitter 332. The third splitter 332 is configured to split the second intermediary optical fiber 340 into a plurality of second distribution optical fibers 344 that are each connected to one of a second set of distribution ports 336 positioned in the panel 306 and accessible for connection from the installer portion 303. For example, FIG. 5 shows a first distribution port 336a, a second distribution port 336b, a third distribution port 336c, and a fourth distribution port 336d of the second set of distribution ports 336. In some embodiments, the second set of distribution ports 336 may include 32 distribution ports (such as shown in FIG. 2). In other embodiments, however, the second set of distribution ports 336 may include more or less than 32 distribution ports. Notably, the third splitter 332 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the third splitter 332 and the number of distribution ports adjusts the optional splitter ratio outputs selectively available—which is contemplated by various embodiments of the present invention.

As noted above, in an example embodiment, the first splitter 314 is a 1×2 splitter. This causes the first main optical fiber 308 to split in half before being connected to the first split adapter port 316 and the second split adapter port 318, each of which are then connected further to the second splitter 330 and the third splitter 332, respectively, through the first intermediary optical fiber 338 and the second intermediary optical fiber 340, respectively, when the first intermediary connector 322a and the second intermediary connector 322b are connected to the first split adapter port 316 and the second split adapter port 318, respectively, as shown in FIG. 5. In this example embodiment, the second splitter 330 and the third splitter 332 that are downstream of the first split adapter port 316 and the second split adapter port 318, respectively, are 1×32 splitters. Because the first main optical fiber 308 was already split by the first splitter 314, the splitter ratio outputs for the first set of distribution ports 334 and the second set of distribution ports 336 are higher (e.g., 1×64). Specifically, the splitter ratio output for the first set of distribution ports 334 or the second set of distribution ports 336 can be calculated by multiplying the magnitude of the second splitter 330 or the third splitter 332 (as appropriate) by the magnitude of the first splitter 314. For example, if the first splitter 314 is a 1×2 splitter and the second splitter 330 and the third splitter 332 are each 1×32 splitters, the splitter ratio output at the first set of distribution ports 334 and the second set of distribution ports 336 is 1×64 (e.g., 1×2×1×32=1×64) at each distribution port.

FIG. 6 illustrates an example communications equipment cabinet assembly 400 including an enclosure 402 with a panel 406 (notably the communications equipment cabinet assembly 400 in FIG. 6 has a similar setup to the communications equipment cabinet assembly 300 in FIG. 5). The panel 406 splits the enclosure 402 into an installer portion 403 and a fiber management portion 401. A feeder cable 404 enters the enclosure 402 from the bottom of the enclosure 402 within the installer portion 403. In other embodiments, however, the feeder cable 404 may enter the enclosure 402 from any other position (including, e.g., from the top of the enclosure 402 within the fiber management portion 401). The feeder cable 404 is, in some embodiments, a casing comprising multiple smaller cables and/or optical fibers. Multiple optical fibers such as, but not limited to, a first main optical fiber 408, a second main optical fiber 410, and a third main optical fiber 412 are fed into the fiber management portion 401 from the feeder cable 404 (notably, in some embodiments, many additional main optical fibers may be included within the feeder cable 404).

Still referring to FIG. 6, a first splitter 414 is positioned within the fiber management portion 401 between the first main optical fiber 408 and a first split adapter port 416 and a second split adapter port 418. The first splitter 414 is configured to split the first main optical fiber 408 into a plurality of secondary optical fibers that are each connected to one of the first split adapter port 416 and the second split adapter port 418 extending from the panel 406 and accessible for connection from the installer portion 403. Notably, the first splitter 414 is a 1×2 splitter, but other splitter ratios are contemplated (such as 1×4, 1×8, 1×16, 1×32, 1×64, etc.). In some such embodiments, however, each split will link in a 1 to 1 ratio to a corresponding adapter port. Adjusting the splitter ratio of the first splitter 414 and the number of adapter ports adjusts the optional splitter ratio outputs selectively available—which is contemplated by various embodiments of the present invention.

Next, the second main optical fiber 410 is connected to a second adapter port 426 positioned in the panel 406 and accessible for connection from the installer portion 403. Similarly, the third main optical fiber 412 is connected to a third adapter port 428 positioned in the panel 406 and accessible for connection from the installer portion 403.

Still referring to the embodiment shown in FIG. 6, a first intermediary connector 422a and a second intermediary connector 422b are connected together and plugged into the second adapter port 426 and the third adapter port 428. The first intermediary connector 422a is connected to a first intermediary optical fiber 438 that leads around and/or through the panel 406 and into the fiber management portion 401. The first intermediary connector 422a is accessible in the installer portion 403. The first intermediary optical fiber 438 is then connected to a second splitter 430. The second splitter 430 is configured to split the first intermediary optical fiber 438 into a plurality of first distribution optical fibers 442 that are each connected to one of a first set of distribution ports 434 positioned in the panel 406 and accessible for connection from the installer portion 403. For example, FIG. 6 shows a first distribution port 434a, a second distribution port 434b, a third distribution port 434c, and a fourth distribution port 434d of the first set of distribution ports 434. In some embodiments, the first set of distribution ports 434 may include 32 distribution ports (such as shown in FIG. 2). In other embodiments, however, the first set of distribution ports 434 may include more or less than 32 distribution ports. Notably, the second splitter 430 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the second splitter 430 and the number of distribution ports adjusts the optional splitter ratio outputs selectively available—which is contemplated by various embodiments of the present invention.

Similarly, the second intermediary connector 422b is connected to a second intermediary optical fiber 440 that leads around and/or through the panel 406 and into the fiber management portion 401. The second intermediary connector 422b is also accessible in the installer portion 403. The second intermediary optical fiber 440 is then connected to a third splitter 432. The third splitter 432 is configured to split the second intermediary optical fiber 440 into a plurality of second distribution optical fibers 444 that are each connected to one of a second set of distribution ports 436 positioned in the panel 406 and accessible for connection from the installer portion 403. For example, FIG. 6 shows a first distribution port 436a, a second distribution port 436b, a third distribution port 436c, and a fourth distribution port 436d of the second set of distribution ports 436. In some embodiments, the second set of distribution ports 436 may include 32 distribution ports (such as shown in FIG. 2). In other embodiments, however, the second set of distribution ports 436 may include more or less than 32 distribution ports. Notably, the third splitter 432 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the third splitter 432 and the number of distribution ports adjusts the optional splitter ratio outputs selectively available—which is contemplated by various embodiments of the present invention.

In the example embodiment shown in FIG. 6, the second splitter 430 and the third splitter 432 that are downstream of the second adapter port 426 and the third adapter port 428, respectively, are 1×32 splitters. Because the second main optical fiber 410 and the third main optical fiber 412 are not already split by a splitter (such as the first splitter 414, which is configured to split the first main optical fiber 408), the splitter ratio outputs for the first set of distribution ports 434 and the second set of distribution ports 436 are lower (e.g., 1×32) than those illustrated by the connections in FIG. 5 (which has the same components as those present in FIG. 6). Specifically, the splitter ratio output for the first set of distribution ports 434 or the second set of distribution ports 436 is equal to the magnitude of the second splitter 430 or the third splitter 432, respectively. For example, if the second splitter 430 and the third splitter 432 are 1×32 splitters, the splitter ratio output at the first set of distribution ports 434 and the second set of distribution ports 436 is 1×32 at each distribution port.

Thus, in the embodiment shown in FIG. 6 as compared to a similar enclosure arrangement in FIG. 5, a user only had to disconnect the first intermediary connector 422a and the second intermediary connector 422b from the first split adapter port 416 and the second split adapter port 418 and then re-connect the first intermediary connector 422a and the second intermediary connector 422b to the second adapter port 426 and the third adapter port 428 in order to change the splitter ratio output at the first set of distribution ports 434 and the second set of distribution ports 436 from, e.g., 1×64 to 1×32. This is useful because it may be necessary to change the splitter ratio output in order to use a certain device or to meet a certain customer demand. Moreover, as will be apparent to one of ordinary skill in the art in view of this disclosure, such a process can be easily completed by a novice technician and even without any access needed to the fiber management portion 401. As noted above, this cuts down on cost, time, and potential failure issues, such as described above.

FIG. 7 illustrates an example communications equipment cabinet assembly 500 including an enclosure 502 with a panel 506 (notably the communications equipment cabinet assembly 500 in FIG. 7 has a similar setup to the communications equipment cabinet assembly 300 in FIG. 5, except that the intermediary connectors are separate instead of connected). The panel 506 splits the enclosure 502 into an installer portion 503 and a fiber management portion 501. A feeder cable 504 enters the enclosure 502 from the bottom of the enclosure 502 within the installer portion 503. In other embodiments, however, the feeder cable 504 may enter the enclosure 502 from any other position (including, e.g., from the top of the enclosure 502 within the fiber management portion 501). The feeder cable 504 is, in some embodiments, a casing comprising multiple smaller cables and/or optical fibers. Multiple optical fibers such as, but not limited to, a first main optical fiber 508, a second main optical fiber 510, and a third main optical fiber 512 are fed into the fiber management portion 501 from the feeder cable 504 (notably, in some embodiments, many additional main optical fibers may be included within the feeder cable 504).

Still referring to FIG. 7, a first splitter 514 is positioned within the fiber management portion 501 between the first main optical fiber 508 and a first split adapter port 516 and a second split adapter port 518. The first splitter 514 is configured to split the first main optical fiber 508 into a plurality of secondary optical fibers that are each connected to one of the first split adapter port 516 and the second split adapter port 518 extending from the panel 506 and accessible for connection from the installer portion 503. Notably, the first splitter 514 is a 1×2 splitter, but other splitter ratios are contemplated (such as 1×4, 1×8, 1×16, 1×32, 1×64, etc.). In some such embodiments, however, each split will link in a 1 to 1 ratio to a corresponding adapter port. Adjusting the splitter ratio of the first splitter 514 and the number of adapter ports adjusts the optional splitter ratio outputs selectively available—which is contemplated by various embodiments of the present invention.

Next, the second main optical fiber 510 is connected to a second adapter port 526 positioned in the panel 506 and accessible for connection from the installer portion 503. Similarly, the third main optical fiber 512 is connected to a third adapter port 528 positioned in the panel 506 and accessible for connection from the installer portion 503.

In some embodiments, such as the embodiment shown in FIG. 7, a first intermediary connector 522a and a second intermediary connector 522b may be designed to be separate and/or separable from each other and plugged in separately such that either of them is plugged into one of a first split adapter port 516, a second split adapter port 518, a second adapter port 526, or a third adapter port 528. For example, in the embodiment shown in FIG. 7, the first intermediary connector 522a and the second intermediary connector 522b have been separated from each other and are plugged into the second split adapter port 518 and the second adapter port 526, respectively.

Still referring to FIG. 7, the first intermediary connector 522a is connected to a first intermediary optical fiber 538 that leads around and/or through the panel 506 and into the fiber management portion 501. The first intermediary connector 522a is accessible in the installer portion 503. The first intermediary optical fiber 538 is then connected to a second splitter 530. The second splitter 530 is configured to split the first intermediary optical fiber 538 into a plurality of first distribution optical fibers 542 that are each connected to one of a first set of distribution ports 534 positioned in the panel 506 and accessible for connection from the installer portion 503. For example, FIG. 7 shows a first distribution port 534a, a second distribution port 534b, a third distribution port 534c, and a fourth distribution port 534d of the first set of distribution ports 534. In some embodiments, the first set of distribution ports 534 may include 32 distribution ports (such as shown in FIG. 2). In other embodiments, however, the first set of distribution ports 534 may include more or less than 32 distribution ports. Notably, the second splitter 530 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the second splitter 530 and the number of distribution ports adjusts the optional splitter ratio outputs selectively available—which is contemplated by various embodiments of the present invention.

Similarly, the second intermediary connector 522b is connected to a second intermediary optical fiber 540 that leads around and/or through the panel 506 and into the fiber management portion 501. The second intermediary connector 522b is also accessible in the installer portion 503. The second intermediary optical fiber 540 is then connected to a third splitter 532. The third splitter 532 is configured to split the second intermediary optical fiber 540 into a plurality of second distribution optical fibers 544 that are each connected to one of a second set of distribution ports 536 positioned in the panel 506 and accessible for connection from the installer portion 503. For example, FIG. 7 shows a first distribution port 536a, a second distribution port 536b, a third distribution port 536c, and a fourth distribution port 536d of the second set of distribution ports 536. In some embodiments, the second set of distribution ports 536 may include 32 distribution ports (such as shown in FIG. 2). In other embodiments, however, the second set of distribution ports 536 may include more or less than 32 distribution ports. Notably, the third splitter 532 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the third splitter 532 and the number of distribution ports adjusts the optional splitter ratio outputs selectively available—which is contemplated by various embodiments of the present invention.

As noted above, in an example embodiment, the first splitter 514 is a 1×2 splitter. This causes the first main optical fiber 508 to split in half before being connected to the first split adapter port 516 and the second split adapter port 518. The second split adapter port 518 is then connected further to second splitter 530 through the first intermediary optical fiber 538 when the first intermediary connector 522a is connected to the second split adapter port 518 as shown in FIG. 7. Similarly, the second adapter port 526 is then connected further to the third splitter 532 through the second intermediary optical fiber 540 when the second intermediary connector 522b is connected to the second adapter port 526 as shown in FIG. 7. In this example embodiment, the second splitter 530 and the third splitter 532 that are downstream of the second split adapter port 518 and the second adapter port 526, respectively, are 1×32 splitters. Because the first main optical fiber 508 was already split by the first splitter 514, the splitter ratio output for the first set of distribution ports 534 is higher than the splitter ratio output for the second set of distribution ports 536 (e.g., the splitter ratio output for the first set of distribution ports 534 is 1×64, while the splitter ratio output for the second set of distribution ports 536 is 1×32). Specifically, the splitter ratio output for the first set of distribution ports 534 can be calculated by multiplying the magnitude of the second splitter 530 by the magnitude of the first splitter 514, and the splitter ratio output for the second set of distribution ports 536 is equal to the magnitude of the third splitter 532. For example, if the first splitter 514 is a 1×2 splitter and the second splitter 530 and the third splitter 532 are 1×32 splitters, the splitter ratio output at the first set of distribution ports 534 is 1×64 at each distribution port, and the splitter ratio output at the second set of distribution ports 536 is 1×32 at each distribution port.

The embodiment shown in FIG. 7 thus enables a user to quickly and easily re-configure either or both of the first intermediary connector 522a and the second intermediary connector 522b in order to change the splitter ratio output at specific distribution port groups (e.g., the first set of distribution ports 534 vs. the second set of distribution ports 536). Such an example system allows for simultaneous operation at 1×64 and 1×32 splitter ratio outputs, respectively. This is useful because it may be necessary to change the splitter ratio output in order to use a certain device or to meet a certain customer demand.

FIG. 8 illustrates an example communications equipment cabinet assembly 600 including an enclosure 602 with a panel 606. The panel 606 splits the enclosure 602 into an installer portion 603 and a fiber management portion 601. A feeder cable 604 enters the enclosure 602 from the bottom of the enclosure 602 within the installer portion 603. In other embodiments, however, the feeder cable 604 may enter the enclosure 602 from any other position (including, e.g., from the top of the enclosure 602 within the fiber management portion 601). The feeder cable 604 is, in some embodiments, a casing comprising multiple smaller cables and/or optical fibers. Multiple optical fibers such as, but not limited to, the first main optical fiber 608 and the second main optical fiber 610 are fed into the fiber management portion 601 from the feeder cable 604 (notably, in some embodiments, many additional main optical fibers may be included within the feeder cable 604).

Still referring to FIG. 8, a first splitter 614 is positioned within the fiber management portion 601 between the first main optical fiber 610 and a first split adapter port 618. The first splitter 614 is configured to split the first main optical fiber 610 into at least one secondary optical fiber that is connected to the first split adapter port 618 extending from the panel 606 and accessible for connection from the installer portion 603. Notably, the first splitter 614 is a 1×2 splitter, but other splitter ratios are contemplated (such as 1×4, 1×8, 1×16, 1×32, 1×64, etc.). In some such embodiments, however, each split will link in a 1 to 1 ratio to a corresponding adapter port. Adjusting the splitter ratio of the first splitter 614 and the number of adapter ports adjusts the optional splitter ratio outputs selectively available—which is contemplated by various embodiments of the present invention.

Next, the second main optical fiber 608 is connected to a second adapter port 626 positioned in the panel 606 and accessible for connection from the installer portion 603.

Still referring to the embodiment shown in FIG. 8, a first intermediary connector 622 is plugged into the first split adapter port 618. The first intermediary connector 622 is connected to a first intermediary optical fiber 638 that leads around and/or through the panel 606 and into the fiber management portion 601. The first intermediary connector 622 is accessible in the installer portion 603. The first intermediary optical fiber 638 is then connected to a second splitter 630. The second splitter 630 is configured to split the first intermediary optical fiber 638 into a plurality of first distribution optical fibers 642 that are each connected to one of a first set of distribution ports 634 positioned in the panel 606 and accessible for connection from the installer portion 603. For example, FIG. 8 shows a first distribution port 634a, a second distribution port 634b, a third distribution port 634c, and a fourth distribution port 634d of the first set of distribution ports 634. In some embodiments, the first set of distribution ports 634 may include 32 distribution ports (such as shown in FIG. 2). In other embodiments, however, the first set of distribution ports 634 may include more or less than 32 distribution ports. Notably, the second splitter 630 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the second splitter 630 and the number of distribution ports adjusts the optional splitter ratio outputs selectively available—which is contemplated by various embodiments of the present invention.

As noted above, in an example embodiment, the first splitter 614 is a 1×2 splitter. This causes the first main optical fiber 610 to split in half before being connected to the first split adapter port 618, which is then connected further to the second splitter 630 through the first intermediary optical fiber 638 when the first intermediary connector 622 is connected to the first split adapter port 618 as shown in FIG. 8. In this example embodiment, the second splitter 630 that is downstream of the first split adapter port 618 is a 1×32 splitter. Because the first main optical fiber 610 was already split by the first splitter 614, the splitter ratio output for the first set of distribution ports 634 is higher (e.g., 1×64). Specifically, the splitter ratio output for the first set of distribution ports 634 can be calculated by multiplying the magnitude of the second splitter 630 by the magnitude of the first splitter 614. For example, if the first splitter 614 is a 1×2 splitter and the second splitter 630 is a 1×32 splitter, the splitter ratio output at the first set of distribution ports 634 is 1×64 at each distribution port.

FIG. 9 illustrates an example communications equipment cabinet assembly 700 including an enclosure 702 with a panel 706. The panel 706 splits the enclosure 702 into an installer portion 703 and a fiber management portion 701. A feeder cable 704 enters the enclosure 702 from the bottom of the enclosure 702 within the installer portion 703. In other embodiments, however, the feeder cable 704 may enter the enclosure 702 from any other position (including, e.g., from the top of the enclosure 702 within the fiber management portion 701). The feeder cable 704 is, in some embodiments, a casing comprising multiple smaller cables and/or optical fibers. Multiple optical fibers such as, but not limited to, the first main optical fiber 708 and the second main optical fiber 710 are fed into the fiber management portion 701 from the feeder cable 704 (notably, in some embodiments, many additional main optical fibers may be included within the feeder cable 704).

Still referring to FIG. 9, a first splitter 714 is positioned within the fiber management portion 701 between the first main optical fiber 708 and a first split adapter port 716 and a second split adapter port 718. The first splitter 714 is configured to split the first main optical fiber 708 into a plurality of secondary optical fibers that are each connected to one of the first split adapter port 716 and the second split adapter port 718 extending from the panel 706 and accessible for connection from the installer portion 703. Notably, the first splitter 714 is a 1×2 splitter, but other splitter ratios are contemplated (such as 1×4, 1×8, 1×16, 1×32, 1×64, etc.). In some such embodiments, however, each split will link in a 1 to 1 ratio to a corresponding adapter port. Adjusting the splitter ratio of the first splitter 714 and the number of adapter ports adjusts the optional splitter ratio outputs selectively available—which is contemplated by various embodiments of the present invention.

Next, the second main optical fiber 710 is connected to a second adapter port 726 positioned in the panel 706 and accessible for connection from the installer portion 703.

Still referring to the embodiment shown in FIG. 9, a first intermediary connector 722a and a second intermediary connector 722b are plugged into the second split adapter port 718 and the second adapter port 726. The first intermediary connector 722a is connected to a first intermediary optical fiber 738 that leads around and/or through the panel 706 and into the fiber management portion 701. The first intermediary connector 722a is accessible in the installer portion 703. The first intermediary optical fiber 738 is then connected to a second splitter 730. The second splitter 730 is configured to split the first intermediary optical fiber 738 into a plurality of first distribution optical fibers 742 that are each connected to one of a first set of distribution ports 734 positioned in the panel 706 and accessible for connection from the installer portion 703. For example, FIG. 9 shows a first distribution port 734a, a second distribution port 734b, a third distribution port 734c, and a fourth distribution port 734d of the first set of distribution ports 734. In some embodiments, the first set of distribution ports 734 may include 32 distribution ports (such as shown in FIG. 2). In other embodiments, however, the first set of distribution ports 734 may include more or less than 32 distribution ports. Notably, the second splitter 730 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the second splitter 730 and the number of distribution ports adjusts the optional splitter ratio outputs selectively available—which is contemplated by various embodiments of the present invention.

Similarly, the second intermediary connector 722b is connected to a second intermediary optical fiber 740 that leads around and/or through the panel 706 and into the fiber management portion 701. The second intermediary connector 722b is also accessible in the installer portion 703. The second intermediary optical fiber 740 is then connected to a third splitter 732. The third splitter 732 is configured to split the second intermediary optical fiber 740 into a plurality of second distribution optical fibers 744 that are each connected to one of a second set of distribution ports 736 positioned in the panel 706 and accessible for connection from the installer portion 703. For example, FIG. 9 shows a first distribution port 736a, a second distribution port 736b, a third distribution port 736c, and a fourth distribution port 736d of the second set of distribution ports 736. In some embodiments, the second set of distribution ports 736 may include 32 distribution ports (such as shown in FIG. 2). In other embodiments, however, the second set of distribution ports 736 may include more or less than 32 distribution ports. Notably, the third splitter 732 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the third splitter 732 and the number of distribution ports adjusts the optional splitter ratio outputs selectively available—which is contemplated by various embodiments of the present invention.

As noted above, in an example embodiment, the first splitter 714 is a 1×2 splitter. This causes the first main optical fiber 708 to split in half before being connected to the first split adapter port 716 and the second split adapter port 718. The second split adapter port 718 is then connected further to the second splitter 730 through the first intermediary optical fiber 738 when the first intermediary connector 722a is connected to the second split adapter port 718 as shown in FIG. 9. The second adapter port 726 is then connected further to the third splitter 732 through the second intermediary optical fiber 740 when the second intermediary connector 722b is connected to the second adapter port 726 as shown in FIG. 9. In this example embodiment, the second splitter 730 and the third splitter 732 that are downstream of the second split adapter port 718 and the second adapter port 726, respectively, are 1×32 splitters. Because the first main optical fiber 708 was already split by the first splitter 714, the splitter ratio output for the first set of distribution ports 734 is higher than the splitter ratio output for the second set of distribution ports 736 (e.g., the splitter ratio output for the first set of distribution ports 734 is 1×64, while the splitter ratio output for the second set of distribution ports 736 is 1×32). Specifically, the splitter ratio output for the first set of distribution ports 734 can be calculated by multiplying the magnitude of the second splitter 730 by the magnitude of the first splitter 714, and the splitter ratio output for the second set of distribution ports 736 is equal to the magnitude of the third splitter 732. For example, if the first splitter 714 is a 1×2 splitter and the second splitter 730 and the third splitter 732 are 1×32 splitters, the splitter ratio output at the first set of distribution ports 734 is 1×64 at each distribution port, and the splitter ratio output at the second set of distribution ports 736 is 1×32 at each distribution port.

FIG. 10 illustrates an example communications equipment cabinet assembly 800 including an enclosure 802 with a panel 806. The panel 806 splits the enclosure 802 into an installer portion 803 and a fiber management portion 801. A feeder cable 804 enters the enclosure 802 from the bottom of the enclosure 802 within the installer portion 803. In other embodiments, however, the feeder cable 804 may enter the enclosure 802 from any other position (including, e.g., from the top of the enclosure 802 within the fiber management portion 801). The feeder cable 804 is, in some embodiments, a casing comprising multiple smaller cables and/or optical fibers. Multiple optical fibers such as, but not limited to, the first main optical fiber 808, the second main optical fiber 811, the third main optical fiber 810, and the fourth main optical fiber 812 are fed into the fiber management portion 801 from the feeder cable 804 (notably, in some embodiments, many additional main optical fibers may be included within the feeder cable 804).

Still referring to FIG. 10, a first splitter 814 is positioned within the fiber management portion 801 between the first main optical fiber 808 and a first split adapter port 816 and a second split adapter port 818. The first splitter 814 is configured to split the first main optical fiber 808 into a plurality of secondary optical fibers that are each connected to one of the first split adapter port 816 and the second split adapter port 818 extending from the panel 806 and accessible for connection from the installer portion 803. Notably, the first splitter 814 is a 1×2 splitter, but other splitter ratios are contemplated (such as 1×4, 1×8, 1×16, 1×32, 1×64, etc.). In some such embodiments, however, each split will link in a 1 to 1 ratio to a corresponding adapter port. Adjusting the splitter ratio of the first splitter 814 and the number of adapter ports adjusts the optional splitter ratio outputs selectively available—which is contemplated by various embodiments of the present invention.

Similarly, a second splitter 815 is positioned within the fiber management portion 801 between the fourth main optical fiber 812 and a third split adapter port 817 and a fourth split adapter port 819. The second splitter 815 is configured to split the fourth main optical fiber 812 into a plurality of secondary optical fibers that are each connected to one of the third split adapter port 817 and the fourth split adapter port 819 extending from the panel 806 and accessible for connection from the installer portion 803. Notably, the second splitter 815 is a 1×4 splitter, but other splitter ratios are contemplated (such as 1×2, 1×8, 1×16, 1×32, 1×64, etc.). In some such embodiments, however, each split will link in a 1 to 1 ratio to a corresponding adapter port. Adjusting the splitter ratio of the second splitter 815 and the number of adapter ports adjusts the optional splitter ratio outputs selectively available—which is contemplated by various embodiments of the present disclosure.

Next, the second main optical fiber 811 is connected to a second adapter port 826 positioned in the panel 806 and accessible for connection from the installer portion 803. Similarly, the third main optical fiber 810 is connected to a third adapter port 828 positioned in the panel 806 and accessible for connection from the installer portion 803.

In some embodiments, such as the embodiment shown in FIG. 10, a first intermediary connector 822a and a second intermediary connector 822b may be designed to be separate and/or separable from each other and plugged in separately such that one is plugged into one of a first set of adapter ports and the other is plugged into one of a second set of adapter ports. For example, in the embodiment shown in FIG. 10, the first intermediary connector 822a and the second intermediary connector 822b have been separated from each other and are plugged into the second split adapter port 818 and the third split adapter port 817.

Still referring to FIG. 10, the first intermediary connector 822a is connected to a first intermediary optical fiber 838 that leads around and/or through the panel 806 and into the fiber management portion 801. The first intermediary connector 822a is accessible in the installer portion 803. The first intermediary optical fiber 838 is then connected to a third splitter 830. The third splitter 830 is configured to split the first intermediary optical fiber 838 into a plurality of first distribution optical fibers 842 that are each connected to one of a first set of distribution ports 834 positioned in the panel 806 and accessible for connection from the installer portion 803. For example, FIG. 10 shows a first distribution port 834a, a second distribution port 834b, a third distribution port 834c, and a fourth distribution port 834d of the first set of distribution ports 834. In some embodiments, the first set of distribution ports 834 may include 32 distribution ports (such as shown in FIG. 2). In other embodiments, however, the first set of distribution ports 834 may include more or less than 32 distribution ports. Notably, the third splitter 830 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the third splitter 830 and the number of distribution ports adjusts the optional splitter ratio outputs selectively available—which is contemplated by various embodiments of the present invention.

Similarly, the second intermediary connector 822b is connected to a second intermediary optical fiber 840 that leads around and/or through the panel 806 and into the fiber management portion 801. The second intermediary connector 822b is also accessible in the installer portion 803. The second intermediary optical fiber 840 is then connected to a fourth splitter 832. The fourth splitter 832 is configured to split the second intermediary optical fiber 840 into a plurality of second distribution optical fibers 844 that are each connected to one of a second set of distribution ports 836 positioned in the panel 806 and accessible for connection from the installer portion 803. For example, FIG. 10 shows a first distribution port 836a, a second distribution port 836b, a third distribution port 836c, and a fourth distribution port 836d of the second set of distribution ports 836. In some embodiments, the second set of distribution ports 836 may include 32 distribution ports (such as shown in FIG. 2). In other embodiments, however, the second set of distribution ports 836 may include more or less than 32 distribution ports. Notably, the fourth splitter 832 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the fourth splitter 832 and the number of distribution ports adjusts the optional splitter ratio outputs selectively available—which is contemplated by various embodiments of the present invention.

As noted above, in an example embodiment, the first splitter 814 is a 1×2 splitter, and the second splitter 815 is a 1×4 splitter. This causes the first main optical fiber 808 to split in half before being connected to the first split adapter port 816 and the second split adapter port 818, and it causes the fourth main optical fiber 812 to split into fourths before being connected to the third split adapter port 817 and the fourth split adapter port 819. The second split adapter port 818 is then connected further to the third splitter 830 through the first intermediary optical fiber 838 when the first intermediary connector 822a is connected to the second split adapter port 818 as shown in FIG. 10. Similarly, the third split adapter port 817 is then connected further to the fourth splitter 832 through the second intermediary optical fiber 840 when the second intermediary connector 822b is connected to the third split adapter port 817 as shown in FIG. 10. In this example embodiment, the third splitter 830 and the fourth splitter 832 that are downstream of the second split adapter port 818 and the third split adapter port 817, respectively, are 1×32 splitters. Because the first main optical fiber 808 was already split in half by the first splitter 814 and the fourth main optical fiber 812 was already split into fourths by the second splitter 815, the splitter ratio output for the second set of distribution ports 836 is higher than the splitter ratio output for the first set of distribution ports 834 (e.g., the splitter ratio output for the second set of distribution ports 836 is 1×128, while the splitter ratio output for the first set of distribution ports 834 is 1×64). Specifically, the splitter ratio output for the first set of distribution ports 834 or the second set of distribution ports 836 can be calculated by multiplying the magnitude of the third splitter 830 or the fourth splitter 832, respectively, by the magnitude of the first splitter 814 or the second splitter 815, respectively. For example, if the first splitter 814 is a 1×2 splitter, the second splitter 815 is a 1×4 splitter, and the third splitter 830 and the fourth splitter 832 are 1×32 splitters, the splitter ratio output at the first set of distribution ports 834 is 1×64 at each distribution port, and the splitter ratio output at the second set of distribution ports 836 is 1×128 at each distribution port.

The embodiment shown in FIG. 10 thus enables a user to quickly and easily re-configure the first intermediary connector 822a and the second intermediary connector 822b in order to change the splitter ratio output at specific distribution port groups (e.g., the first set of distribution ports 834 vs. the second set of distribution ports 836). Such an example allows for simultaneous operation at 1×64 and 1×128 splitter ratio outputs, respectively, and it also allows for the user to easily switch to a splitter ratio output of 1×32 at either of the first set of distribution ports 834 or the second set of distribution ports 836 (such by connecting the first intermediary connector 822a to the second adapter port 826 and the second intermediate connector 822b to the third adapter port 828). This is useful because it may be necessary to change the splitter ratio output to one of a variety of values in order to use a certain device or to meet a certain customer demand.

FIG. 11 illustrates an example communications equipment cabinet assembly 900 including an enclosure 902 with a panel 906. The panel 906 splits the enclosure 902 into an installer portion 903 and a fiber management portion 901. A feeder cable 904 enters the enclosure 902 from the bottom of the enclosure 902 within the installer portion 903. In other embodiments, however, the feeder cable 904 may enter the enclosure 902 from any other position (including, e.g., from the top of the enclosure 902 within the fiber management portion 901). The feeder cable 904 is, in some embodiments, a casing comprising multiple smaller cables and/or optical fibers. Multiple optical fibers such as, but not limited to, a first main optical fiber 908, a second main optical fiber 910, and a third main optical fiber 912 are fed into the fiber management portion 901 from the feeder cable 904 (notably, in some embodiments, many additional main optical fibers may be included within the feeder cable 904).

Still referring to FIG. 11, a first splitter 914 is positioned within the fiber management portion 901 between the first main optical fiber 912 and a first split adapter port 916 and a second split adapter port 918. The first splitter 914 is configured to split the first main optical fiber 912 into a plurality of secondary optical fibers that are each connected to one of the first split adapter port 916 and the second split adapter port 918 extending from the panel 906 and accessible for connection from the installer portion 903. Notably, the first splitter 914 is a 1×2 splitter, but other splitter ratios are contemplated (such as 1×4, 1×8, 1×16, 1×32, 1×64, etc.). In some such embodiments, however, each split will link in a 1 to 1 ratio to a corresponding adapter port. Adjusting the splitter ratio of the first splitter 914 and the number of adapter ports adjusts the optional splitter ratio outputs selectively available—which is contemplated by various embodiments of the present invention.

Next, the second main optical fiber 910 is connected to a second adapter port 926 positioned in the panel 906 and accessible for connection from the installer portion 903. Similarly, the third main optical fiber 908 is connected to a third adapter port 928 positioned in the panel 906 and accessible for connection from the installer portion 903.

In some embodiments, such as the embodiment shown in FIG. 11, a first intermediary connector 922a, a second intermediary connector 922b, and a third intermediary connector 922c may be plugged in such that, e.g., one is plugged into at least one of the first split adapter port 916 and/or the second split adapter port 918 and the other(s) are plugged into at least one of the second adapter port 926 and/or the third adapter port 928, respectively. For example, in the embodiment shown in FIG. 11, the first intermediary connector 922a, the second intermediary connector 922b, and the third intermediary connector 922c are plugged into the second split adapter port 918, the second adapter port 926, and the third adapter port 928, respectively.

Still referring to FIG. 11, the first intermediary connector 922a is connected to a first intermediary optical fiber 940 that leads around and/or through the panel 906 and into the fiber management portion 901. The first intermediary connector 922a is accessible in the installer portion 903. The first intermediary optical fiber 940 is then connected to a second splitter 930. The second splitter 930 is configured to split the first intermediary optical fiber 940 into a plurality of first distribution optical fibers 942 that are each connected to one of a first set of distribution ports 934 positioned in the panel 906 and accessible for connection from the installer portion 903. For example, FIG. 11 shows a first distribution port 934a, a second distribution port 934b, a third distribution port 934c, and a fourth distribution port 934d of the first set of distribution ports 934. In some embodiments, the first set of distribution ports 934 may include 32 distribution ports (such as shown in FIG. 2). In other embodiments, however, the first set of distribution ports 934 may include more or less than 32 distribution ports. Notably, the second splitter 930 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the second splitter 930 and the number of distribution ports adjusts the optional splitter ratio outputs selectively available—which is contemplated by various embodiments of the present invention.

Similarly, the second intermediary connector 922b is connected to a second intermediary optical fiber 939 that leads around and/or through the panel 906 and into the fiber management portion 901. The second intermediary connector 922b is also accessible in the installer portion 903. The second intermediary optical fiber 939 is then connected to a third splitter 932. The third splitter 932 is configured to split the second intermediary optical fiber 939 into a plurality of second distribution optical fibers 933 that are each connected to one of a second set of distribution ports 936 positioned in the panel 906 and accessible for connection from the installer portion 903. For example, FIG. 11 shows a first distribution port 936a, a second distribution port 936b, a third distribution port 936c, and a fourth distribution port 936d of the second set of distribution ports 936. In some embodiments, the second set of distribution ports 936 may include 32 distribution ports (such as shown in FIG. 2). In other embodiments, however, the second set of distribution ports 936 may include more or less than 32 distribution ports. Notably, the third splitter 932 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the third splitter 932 and the number of distribution ports adjusts the optional splitter ratio outputs selectively available—which is contemplated by various embodiments of the present invention.

Similarly, the third intermediary connector 922c is connected to a third intermediary optical fiber 938 that leads around and/or through the panel 906 and into the fiber management portion 901. The third intermediary connector 922c is also accessible in the installer portion 903. The third intermediary optical fiber 938 is then connected to a fourth splitter 931. The fourth splitter 931 is configured to split the third intermediary optical fiber 938 into a plurality of third distribution optical fibers 941 that are each connected to one of a third set of distribution ports 935 positioned in the panel 906 and accessible for connection from the installer portion 903. For example, FIG. 11 shows a first distribution port 935a, a second distribution port 935b, a third distribution port 935c, and a fourth distribution port 935d of the third set of distribution ports 935. In some embodiments, the third set of distribution ports 935 may include 32 distribution ports (such as shown in FIG. 2). In other embodiments, however, the third set of distribution ports 935 may include more or less than 32 distribution ports. Notably, the fourth splitter 931 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the fourth splitter 931 and the number of distribution ports adjusts the optional splitter ratio outputs selectively available—which is contemplated by various embodiments of the present invention.

As noted above, in an example embodiment, the first splitter 914 is a 1×2 splitter. This causes the first main optical fiber 912 to split in half before being connected to the first split adapter port 916 and the second split adapter port 918. The second split adapter port 918 is then connected further to the second splitter 930 through the first intermediary optical fiber 940 when the first intermediary connector 922a is connected to the second split adapter port 918 as shown in FIG. 11. Similarly, the second adapter port 926 is then connected further to the third splitter 932 through the second intermediary optical fiber 939 when the second intermediary connector 922b is connected to the second adapter port 926 as shown in FIG. 11. The third adapter port 928 is then connected further to the fourth splitter 931 through the third intermediary optical fiber 938 when the third intermediary connector 922c is connected to the third adapter port 928 as shown in FIG. 11. In this example embodiment, the second splitter 930, the third splitter 932, and the fourth splitter 931 that are downstream of the second split adapter port 918, the second adapter port 926, and the third adapter port 928, respectively, are 1×32 splitters. Because the first main optical fiber 912 was already split by the first splitter 914, the splitter ratio output for the first set of distribution ports 934 is higher than the splitter ratio outputs for the second set of distribution ports 936 and the third set of distribution ports 935 (e.g., the splitter ratio output for the first set of distribution ports 934 is 1×64, while the splitter ratio outputs for the second set of distribution ports 936 and the third set of distribution ports 935 is 1×32). Specifically, the splitter ratio output for the first set of distribution ports 934 can be calculated by multiplying the magnitude of the second splitter 930 by the magnitude of the first splitter 914, and the splitter ratio outputs for the second set of distribution ports 936 and the third set of distribution ports 935 are equal to the magnitudes of the third splitter 932 and the fourth splitter 931, respectively. For example, if the first splitter 914 is a 1×2 splitter and the second splitter 930, the third splitter 932, and the fourth splitter 931 are 1×32 splitters, the splitter ratio output at the first set of distribution ports 934 is 1×64 at each distribution port, and the splitter ratio outputs at the second set of distribution ports 936 and the third set of distribution ports 935 are 1×32 at each distribution port.

The embodiment shown in FIG. 11 thus enables a user to quickly and easily re-configure the first intermediary connector 922a, the second intermediary connector 922b, and the third intermediary connector 922c in order to change the splitter ratio output at specific distribution port groups (e.g., the first set of distribution ports 934 vs. the second set of distribution ports 936 vs. the third set of distribution ports 935). Such an example allows for simultaneous operation at 1×64 and 1×32 splitter ratio outputs, respectively. This is useful because it may be necessary to change the splitter ratio output in order to use a certain device or to meet a certain customer demand. Further, since the embodiment shown in FIG. 11 has three sets of distribution ports instead of two, the system provides more splitter ratio output options to the user.

FIG. 12 illustrates an example communications equipment cabinet assembly 1000 including an enclosure 1002 with a panel 1006. The panel 1006 splits the enclosure 1002 into an installer portion 1003 and a fiber management portion 1001. A feeder cable 1004 enters the enclosure 1002 from the bottom of the enclosure 1002 within the installer portion 1003. In other embodiments, however, the feeder cable 1004 may enter the enclosure 1002 from any other position (including, e.g., from the top of the enclosure 1002 within the fiber management portion 1001). The feeder cable 1004 is, in some embodiments, a casing comprising multiple smaller cables and/or optical fibers. Multiple optical fibers such as, but not limited to, a first main optical fiber 1011, a second main optical fiber 1010, a third main optical fiber 1009, a the fourth main optical fiber 1008 are fed into the fiber management portion 1001 from the feeder cable 1004 (notably, in some embodiments, many additional main optical fibers may be included within the feeder cable 1004).

Still referring to FIG. 12, a first splitter 1014 is positioned within the fiber management portion 1001 between the first main optical fiber 1011 and a first split adapter port 1016 and a second split adapter port 1018. The first splitter 1014 is configured to split the first main optical fiber 1011 into a plurality of secondary optical fibers that are each connected to one of the first split adapter port 1016 and the second split adapter port 1018 extending from the panel 1006 and accessible for connection from the installer portion 1003. Notably, the first splitter 1014 is a 1×2 splitter, but other splitter ratios are contemplated (such as 1×4, 1×8, 1×16, 1×32, 1×64, etc.). In some such embodiments, however, each split will link in a 1 to 1 ratio to a corresponding adapter port. Adjusting the splitter ratio of the first splitter 1014 and the number of adapter ports adjusts the optional splitter ratio outputs selectively available—which is contemplated by various embodiments of the present invention.

Similarly, a second splitter 1015 is positioned within the fiber management portion 1001 between the second main optical fiber 1010 and a third split adapter port 1017 and a fourth split adapter port 1019. The second splitter 1015 is configured to split the second main optical fiber 1010 into a plurality of secondary optical fibers that are each connected to one of the third split adapter port 1017 and the fourth split adapter port 1019 extending from the panel 1006 and accessible for connection from the installer portion 1003. Notably, the second splitter 1015 is a 1×4 splitter, but other splitter ratios are contemplated (such as 1×2, 1×8, 1×16, 1×32, 1×64, etc.). In some such embodiments, however, each split will link in a 1 to 1 ratio to a corresponding adapter port. Adjusting the splitter ratio of the second splitter 1015 and the number of adapter ports adjusts the optional splitter ratio outputs selectively available—which is contemplated by various embodiments of the present invention.

Next, the third main optical fiber 1009 is connected to a second adapter port 1026 positioned in the panel 1006 and accessible for connection from the installer portion 1003. Similarly, the fourth main optical fiber 1008 is connected to a third adapter port 1028 positioned in the panel 1006 and accessible for connection from the installer portion 1003.

In some embodiments, such as the embodiment shown in FIG. 12, a first intermediary connector 1022a, a second intermediary connector 1022b, and a third intermediary connector 1022c may be plugged into, e.g., at least one of the first split adapter port 1016, the second split adapter port 1018, the third split adapter port 1017, and/or the fourth split adapter port 1019, and the others may be plugged into, e.g., at least one of the second adapter port 1026 and the third adapter port 1028. For example, in the embodiment shown in FIG. 12, the first intermediary connector 1022a, the second intermediary connector 1022b, and the third intermediary connector 1022c are plugged into the second split adapter port 1018, the fourth adapter port 1019, and the third adapter port 1028, respectively.

Still referring to FIG. 12, the first intermediary connector 1022a is connected to a first intermediary optical fiber 1040 that leads around and/or through the panel 1006 and into the fiber management portion 1001. The first intermediary connector 1022a is accessible in the installer portion 1003. The first intermediary optical fiber 1040 is then connected to a third splitter 1030. The third splitter 1030 is configured to split the first intermediary optical fiber 1040 into a plurality of first distribution optical fibers 1042 that are each connected to one of a first set of distribution ports 1034 positioned in the panel 1006 and accessible for connection from the installer portion 1003. For example, FIG. 12 shows a first distribution port 1034a, a second distribution port 1034b, a third distribution port 1034c, and a fourth distribution port 1034d of the first set of distribution ports 1034. In some embodiments, the first set of distribution ports 1034 may include 32 distribution ports (such as shown in FIG. 2). In other embodiments, however, the first set of distribution ports 1034 may include more or less than 32 distribution ports. Notably, the third splitter 1030 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the third splitter 1030 and the number of distribution ports adjusts the optional splitter ratio outputs selectively available—which is contemplated by various embodiments of the present invention.

Similarly, the second intermediary connector 1022b is connected to a second intermediary optical fiber 1039 that leads around and/or through the panel 1006 and into the fiber management portion 1001. The second intermediary connector 1022b is also accessible in the installer portion 1003. The second intermediary optical fiber 1039 is then connected to a fourth splitter 1032. The fourth splitter 1032 is configured to split the second intermediary optical fiber 1039 into a plurality of second distribution optical fibers 1041 that are each connected to one of a second set of distribution ports 1036 positioned in the panel 1006 and accessible for connection from the installer portion 1003. For example, FIG. 12 shows a first distribution port 1036a, a second distribution port 1036b, a third distribution port 1036c, and a fourth distribution port 1036d of the second set of distribution ports 1036. In some embodiments, the second set of distribution ports 1036 may include 32 distribution ports (such as shown in FIG. 2). In other embodiments, however, the second set of distribution ports 1036 may include more or less than 32 distribution ports. Notably, the fourth splitter 1032 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the fourth splitter 1032 and the number of distribution ports adjusts the optional splitter ratio outputs selectively available—which is contemplated by various embodiments of the present invention.

Similarly, the third intermediary connector 1022c is connected to a third intermediary optical fiber 1038 that leads around and/or through the panel 1006 and into the fiber management portion 1001. The third intermediary connector 1022c is also accessible in the installer portion 1003. The third intermediary optical fiber 1038 is then connected to a fifth splitter 1033. The fifth splitter 1033 is configured to split the third intermediary optical fiber 1038 into a plurality of third distribution optical fibers 1043 that are each connected to one of a third set of distribution ports 1035 positioned in the panel 1006 and accessible for connection from the installer portion 1003. For example, FIG. 12 shows a first distribution port 1035a, a second distribution port 1035b, a third distribution port 1035c, and a fourth distribution port 1035d of the third set of distribution ports 1035. In some embodiments, the third set of distribution ports 1035 may include 32 distribution ports (such as shown in FIG. 2). In other embodiments, however, the third set of distribution ports 1035 may include more or less than 32 distribution ports. Notably, the fifth splitter 1033 is a 1×32 splitter, but other splitter ratios are contemplated (such as 1×2, 1×4, 1×8, 1×16, 1×64, etc.). In some such embodiments, however, each split will link in a 1 to 1 ratio to a corresponding distribution port. Adjusting the splitter ratio of the fifth splitter 1033 and the number of distribution ports adjusts the optional splitter ratio outputs selectively available—which is contemplated by various embodiments of the present invention.

As noted above, in an example embodiment, the first splitter 1014 is a 1×2 splitter, and the second splitter 1015 is a 1×4 splitter. This causes the first main optical fiber 1011 to split in half before being connected to the first split adapter port 1016 and the second split adapter port 1018, and it causes the second main optical fiber 1010 to split into fourths before being connected to the third split adapter port 1017 and the fourth split adapter port 1019. The second split adapter port 1018 is connected further to the third splitter 1030 through the first intermediary optical fiber 1040 when the first intermediary connector 1022a is connected to the second split adapter port 1018 as shown in FIG. 12. Similarly, the fourth split adapter port 1019 is connected further to the fourth splitter 1032 through the second intermediary optical fiber 1039 when the second intermediary connector 1022b is connected to the fourth split adapter port 1019 as shown in FIG. 12. The third adapter port 1028 is then connected further to the fifth splitter 1033 through the third intermediary optical fiber 1038 when the third intermediary connector 1022c is connected to the third adapter port 1028 as shown in FIG. 12. In this example embodiment, the third splitter 1030, the fourth splitter 1032, and the fifth splitter 1033 that are downstream of the second split adapter port 1018, the fourth split adapter port 1019, and the third adapter port 1028, respectively, are 1×32 splitters. Because the first main optical fiber 1011 was already split in half by the first splitter 1014 and the second main optical fiber 1010 was already split into fourths by the second splitter 1015, the splitter ratio output for the second set of distribution ports 1036 is higher than the splitter ratio output for the first set of distribution ports 1034 (e.g., the splitter ratio output for the second set of distribution ports 1036 is 1×128, while the splitter ratio output for the first set of distribution ports 1034 is 1×64). Specifically, the splitter ratio output for the first set of distribution ports 1034 or the second set of distribution ports 1036 can be calculated by multiplying the magnitude of the third splitter 1030 or the fourth splitter 1032, respectively, by the magnitude of the first splitter 1014 or the second splitter 1015, respectively. For example, if the first splitter 1014 is a 1×2 splitter, the second splitter 1015 is a 1×4 splitter, and the third splitter 1030 and the fourth splitter 1032 are 1×32 splitters, the splitter ratio output at the first set of distribution ports 1034 is 1×64 at each distribution port, and the splitter ratio output at the second set of distribution ports 1036 is 1×128 at each distribution port. Further, if the fifth splitter 1033 is a 1×32 splitter, the splitter ratio output for the third set of distribution ports 1035 is 1×32 when the third intermediary connector 1022c is plugged into either of the second adapter port 1026 or the third adapter port 1028 because there is no splitter upstream of the second adapter port 1026 or the third adapter port 1028.

The embodiment shown in FIG. 12 thus enables a user to quickly and easily re-configure the first intermediary connector 1022a, the second intermediary connector 1022b, and the third intermediary connector 1022c in order to change the splitter ratio output at specific distribution port groups (e.g., the first set of distribution ports 1034 vs. the second set of distribution ports 1036 vs. the third set of distribution ports 1035). Such an example allows for simultaneous operation at 1×64, 1×128, and 1×32 splitter ratio outputs, respectively, when the first intermediary connector 1022a, the second intermediary connector 1022b, and the third intermediary connector 1022c are each connected to different pairs of ports. This is useful because it may be necessary to use multiple different splitter ratio output values at once to meet customer demand.

In summary, as shown in FIGS. 5-12, one or more intermediary connector(s) may be connectable to one of a plurality of adapter ports to enable an installer to selectively define a splitter ratio output for each of one or more set(s) of distribution ports such that a downstream installation optical fiber connected to one of the set(s) of distribution ports receives output at a selected splitter ratio output. As illustrated and explained, the one or more intermediary connector(s) may be configured such that the splitter ratio output can easily be changed by a user, and in some embodiments, the system may be configured such that multiple splitter ratio outputs can be selected simultaneously.

In some embodiments, one or more upstream splitters may be a 1×2 splitter, a 1×4 splitter, or any other kind of splitter. Further, in some embodiments, one or more downstream splitters may be 1×16 splitters, 1×32 splitters, 1×64 splitters, any other kind of splitters, or any combination thereof. Moreover, more or less main optical fibers may be provided, each with different splitters and, correspondingly, more adapter ports may be provided. This may provide even more optionality for splitter ratio outputs. Indeed, the described and illustrated embodiments are merely meant to illustrate an example approach to achieve some example splitter ratio outputs.

FIG. 13 illustrates an example communications equipment cabinet assembly 1100 including an enclosure 1102 with a panel 1106. The panel 1106 splits the enclosure 1102 into an installer portion 1103 and a fiber management portion 1101. The enclosure 1102 includes a plurality of distribution ports 1134 in the fiber management portion 1101, which are connected to a plurality of distribution optical fibers 1140. As described herein, the plurality of distribution ports 1134 may be connected through the plurality of distribution optical fibers 1140 to one or more splitters (not shown), and the one or more splitters may be connected to one or more of a first adapter port 1150, a second adapter port 1151, a third adapter port 1152, a fourth adapter port 1153, a fifth adapter port 1154, or a sixth adapter port 1155 through one or more intermediary optical fibers. The assembly 1100 may then include one or more intermediary connector(s) that are configured to allow a user to select a splitter ratio output for the plurality of distribution ports 1134 by plugging in the one or more intermediary connectors to one or more of the first adapter port 1150, the second adapter port 1151, the third adapter port 1152, the fourth adapter port 1153, the fifth adapter port 1154, or the sixth adapter port 1155 that correspond to the desired splitter ratio output(s). Notably, the plurality of distribution ports 1134 are not accessible in the installer portion 1103 (as with other example assemblies described herein), but the described example provides the ability for an installer to easily adjust the splitter ratio outputs for those preset distribution ports. In this regard, various example embodiments may be utilized in various types of communications equipment assemblies.

FIG. 14 illustrates an example rack assembly 1200 including a first tray 1201, a second tray 1202, and a third tray 1203 disposed between a first riser 1222 and a second riser 1224. The second tray 1202 includes, on the side of the second tray 1202 proximate the first riser 1222, a first adapter port 1204, a second adapter port 1206, and a third adapter port 1208. The second tray 1202 also includes, on the side of the second tray 1202 proximate the second riser 1224, a set of distribution ports 1218. For example, the set of distribution ports 1218 includes a first distribution port 1218*a*, a second distribution port 1218*b*, a third distribution port 1218*c*, a fourth distribution port 1218*d*, a fifth distribution port 1218*e*, a sixth distribution port 1218*f*, a seventh distribution port 1218*g*, an eighth distribution port 1218*h*, a ninth distribution port 1218*i*, a tenth distribution port 1218*j*, an eleventh distribution port 1218*k*, a twelfth distribution port 1218*l*, a thirteenth distribution port 1218*m*, a fourteenth distribution port 1218*n*, a fifteenth distribution port 1218*o*, and a sixteenth distribution port 1218*p*. The assembly 1200 also includes a first intermediary connector 1210, which is connected to a first intermediary fiber 1214 leading around or through the second tray 1202, and a second intermediary connector 1212, which is connected to a second intermediary fiber 1216 leading around or through the second tray 1202. In some embodiments, the assembly 1200 may be wired in a configuration similar to the embodiment shown in FIG. 9 such that the first intermediary connector 1210 and the second intermediary connector 1212 are connectable to any one of the first adapter port 1204, the second adapter port 1206, or the third adapter port 1208 such that a user can select one or more desired splitter ratio output(s) for the set of distribution ports 1218. For example, in some embodiments, the first adapter port 1204 may be connected directly to a downstream splitter, with no upstream splitter, and the second adapter port 1206 and the third adapter port 1208 may be connected to both an upstream splitter and a downstream splitter, such that the first intermediary connector 1210 being connected to the first adapter port 1204 causes a first portion of the set of distribution ports 1218 to have a 1×32 splitter output ratio and the second intermediary connector 1212 being connected to the second adapter port 1206 causes a second portion of the set of distribution ports 1218 to have a 1×64 splitter output ratio. In other embodiments, the assembly 1200 may be manufactured in any other way with splitter(s) in various locations such that different splitter ratio output options are available.

Example Flowchart(s)

Embodiments of the present disclosure provide various methods for manufacturing an enclosure configured for selectively defining optical fiber splitter ratio outputs, such as described herein. Various examples of the operations performed in accordance with some embodiments of the present disclosure will now be provided with reference to FIG. 15.

FIG. 15 illustrates a flowchart according to an example method 1300 of manufacturing an enclosure configured for selectively defining optical fiber splitter ratio outputs according to an example embodiment. The method 1300 may include positioning a panel within an enclosure at operation 1302. For example, the enclosure may be an enclosure such as any of those disclosed herein. At operation 1304, the method comprises extending a feeder cable into the enclosure, as described herein. For example, extending the feeder cable at operation 1304 may include extending a feeder cable that comprises a plurality of main optical fibers therein that extend into a fiber management portion of the enclosure. Further, the plurality of main optical fibers may comprise at least a first main optical fibers and a second main optical fiber, as described herein. At operation 1306, the method may comprise installing a first splitter (and a first split adapter port). For example, the first splitter may be installed on the first main optical fiber and positioned within the fiber management portion such that the first splitter is configured to split the first main optical fiber into at least one secondary optical fiber that is connected to the first split adapter port positioned in the panel and accessible for connection from an installer portion of the enclosure.

At operation 1308, the method may comprise installing a second adapter port. For example, installing the second adapter port may comprise connecting the second adapter port to the second main optical fiber and positioning the second adapter port in the panel such that the second adapter port is accessible for connection from the installer portion. At operation 1310, the method may include installing a first intermediary connector. For example, installing the first intermediary connector may include connecting the first intermediary connector to a first intermediary optical fiber such that the first intermediary optical fiber leads around or through the panel and into the fiber management portion of the enclosure and such that the first intermediary connector is accessible in the installer portion.

At operation 1312, the method may include installing a second splitter, and at operation 1314, the method may include connecting a plurality of first distribution optical fibers to a first set of distribution optical fibers. For example, installing the second splitter and connecting the plurality of first distribution optical fibers to the first set of distribution optical fibers may include installing the second splitter on the first intermediary optical fiber and positioning the second splitter within the fiber management portion such that the second splitter is configured to split the first intermediary optical fiber into a plurality of first distribution optical fibers that are each connected to one of a first set of distribution ports positioned in the panel and accessible for connection from the installer portion. In some embodiments, the manufacturing operations may be performed such that the first intermediary connector is connectable to one of the first split adapter port or the second adapter port to enable an installer to selectively define a first splitter ratio for each of the first set of distribution ports such that a first downstream installation optical fiber connected to one of the first set of distribution ports receives output at the first splitter ratio. Further, in some embodiments, additional splitters and adapter ports may be installed, as described herein, such that multiple splitter ratio outputs are available for selection to a user. Even further, in some embodiments, the manufacturing operations may be configured such that multiple splitter ratio outputs are simultaneously selectable, as described herein. Additional manufacturing operations and/or additional usage operations are also contemplated.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

CONCLUSION

Many modifications and other embodiments of the disclosures set forth herein will come to mind to one skilled in the art to which these present disclosures pertain having the benefit of the teachings presented in the foregoing descriptions and the associated drawings. Therefore, it is to be understood that the embodiments of the present disclosure are not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated within the scope of the present disclosure. Although specific terms are employed herein, they are used in a generic and descriptive sense only and not for purposes of limitation.

The invention claimed is:

1. A system for selectively defining optical fiber splitter ratios within an enclosure, the system comprising:
a feeder cable extending into the enclosure, wherein the feeder cable comprises a plurality of main optical fibers therein that extend into the enclosure, wherein the plurality of main optical fibers comprises at least a first main optical fiber and a second main optical fiber;
a first splitter attached to the first main optical fiber and configured to split the first main optical fiber into at least one secondary optical fiber that is connected to a first split adapter port positioned in the enclosure;
wherein the second main optical fiber is connected to a second adapter port positioned in the enclosure;
a first intermediary connector connected to a first intermediary optical fiber; and
a second splitter attached to the first intermediary optical fiber and configured to split the first intermediary optical fiber into a plurality of first distribution optical fibers that are each connected to one of a first set of distribution ports positioned in the enclosure;
wherein the first intermediary connector is connectable to one of the first split adapter port or the second adapter port to enable an installer to selectively define a first splitter ratio for each of the first set of distribution ports such that a first downstream installation optical fiber connected to one of the first set of distribution ports receives output at the first splitter ratio.

2. The system of claim 1, wherein the enclosure further includes a panel that defines an installer portion of the enclosure and a fiber management portion of the enclosure.

3. The system of claim 2, wherein the first intermediary connector and the first set of distribution ports are accessible from the installer portion of the enclosure, wherein the first splitter and the second splitter are within the fiber management portion of the enclosure, and wherein the first intermediary optical fiber leads around or through the panel from the installer portion of the enclosure to the fiber management portion of the enclosure.

4. The system of claim 2, wherein the feeder cable extends into the fiber management portion of the enclosure.

5. The system of claim 2, wherein the feeder cable extends into the installer portion of the enclosure.

6. The system of claim 1, wherein the first splitter is a 1×2 splitter.

7. The system of claim 6, wherein the second splitter is a 1×32 splitter.

8. The system of claim 6, wherein the second splitter is a 1×16 splitter.

9. The system of claim 1, wherein the first splitter attached to the first main optical fiber is configured to split the first main optical fiber into a first plurality of secondary optical fibers that are each connected to one of a first set of adapter ports positioned in the enclosure, wherein the first set of adapter ports comprises at least the first split adapter port and a second split adapter port, and wherein the system further comprises:
a second intermediary connector connected to a second intermediary optical fiber; and
a third splitter attached to the second intermediary optical fiber and configured to split the second intermediary optical fiber into a plurality of second distribution optical fibers that are each connected to one of a second set of distribution ports positioned in the enclosure,
wherein the first intermediary connector is connectable to one of the first split adapter port, the second split adapter port, or the second adapter port to enable an installer to selectively define the first splitter ratio,
wherein the second intermediary connector is connectable to one of the first split adapter port, the second split adapter port, or the second adapter port to enable the installer to selectively define a second splitter ratio for each of the second set of distribution ports such that a second downstream installation optical fiber connected to one of the second set of distribution ports receives output at the second splitter ratio.

10. The system of claim 9, wherein the first splitter is a 1×2 splitter, wherein the second splitter is a 1×32 splitter, and wherein the third splitter is a 1×32 splitter.

11. The system of claim 9, wherein the first intermediary connector and the second intermediary connector are connected.

12. The system of claim 9, wherein the first intermediary connector and the second intermediary connector are separate or separable.

13. The system of claim 1, wherein the plurality of main optical fibers further comprises a third main optical fiber, and wherein the system further comprises:
a third splitter attached to the third main optical fiber and configured to split the third main optical fiber into a plurality of secondary optical fibers that are each connected to one of a third set of adapter ports positioned in the enclosure, wherein the third set of adapter ports comprises at least a third split adapter port and a fourth split adapter port;
a second intermediary connector connected to a second intermediary optical fiber; and
a fourth splitter attached to the second intermediary optical fiber and configured to split the second intermediary optical fiber into a plurality of second distribution optical fibers that are each connected to one of a second set of distribution ports positioned in the enclosure,
wherein the first intermediary connector is further connectable to one of the third split adapter port or the fourth split adapter port to enable an installer to selectively define the first splitter ratio, and
wherein the second intermediary connector is connectable to one of the third split adapter port or the fourth split adapter port to enable an installer to selectively define a second splitter ratio for each of the second set of distribution ports such that a second downstream installation optical fiber connected to one of the second set of distribution ports receives output at the second splitter ratio.

14. The system of claim 13, wherein the first splitter is a 1×2 splitter, wherein the second splitter is a 1×16 splitter, wherein the third splitter is a 1×4 splitter, and wherein the fourth splitter is a 1×16 splitter.

15. The system of claim 13, wherein the system further comprises:
a third intermediary connector connected to a third intermediary optical fiber; and
a fifth splitter attached to the third intermediary optical fiber and configured to split the third intermediary optical fiber into a plurality of third distribution optical fibers that are each connected to one of a third set of distribution ports positioned in the enclosure,
wherein the third intermediary connector is connectable to one of the first split adapter port, the second adapter port, the third split adapter port, or the fourth split adapter port to enable an installer to selectively define a third splitter ratio for each of the third set of distribution ports such that a third downstream installation optical fiber connected to one of the third set of distribution ports receives output at the third splitter ratio.

16. The system of claim 15, wherein the first splitter is a 1×2 splitter, wherein the second splitter is a 1×16 splitter, wherein the third splitter is a 1×4 splitter, wherein the fourth splitter is a 1×16 splitter, and wherein the fifth splitter is a 1×32 splitter.

17. The system of claim 1, wherein the first set of distribution ports comprises 32 distribution ports.

18. An enclosure configured for selectively defining optical fiber splitter ratios, the enclosure comprising:
a panel that defines an installer portion of the enclosure and a fiber management portion of the enclosure;
a feeder cable extending into the enclosure, wherein the feeder cable comprises a plurality of main optical fibers therein that extend into the fiber management portion of the enclosure, wherein the plurality of main optical fibers comprises at least a first main optical fiber and a second main optical fiber;
a first splitter positioned within the fiber management portion, attached to the first main optical fiber, and configured to split the first main optical fiber into at least one secondary optical fiber that is connected to a first split adapter port positioned in the panel and accessible for connection from the installer portion,
wherein the second main optical fiber is connected to a second adapter port positioned in the panel and accessible for connection from the installer portion;
a first intermediary connector connected to a first intermediary optical fiber that leads around or through the panel and into the fiber management portion, wherein the first intermediary connector is accessible in the installer portion; and
a second splitter attached to the first intermediary optical fiber and configured to split the first intermediary optical fiber into a plurality of first distribution optical fibers that are each connected to one of a first set of distribution ports positioned in the panel and accessible for connection from the installer portion;
wherein the first intermediary connector is connectable to one of the first split adapter port or the second adapter port to enable an installer to selectively define a first splitter ratio for each of the first set of distribution ports such that a first downstream installation optical fiber connected to one of the first set of distribution ports receives output at the first splitter ratio.

19. The system of claim 18, wherein the first splitter is a 1×2 splitter.

20. The system of claim 19, wherein the second splitter is a 1×32 splitter.

21. A method of manufacturing an enclosure configured for selectively defining optical fiber splitter ratios, the method comprising:
positioning a panel within the enclosure to define an installer portion of the enclosure and a fiber management portion of the enclosure;
extending a feeder cable into the enclosure, wherein the feeder cable comprises a plurality of main optical fibers therein that extend into the fiber management portion of the enclosure, wherein the plurality of main optical fibers comprises at least a first main optical fiber and a second main optical fiber;
installing a first splitter on the first main optical fiber and positioning the first splitter within the fiber management portion such that the first splitter is configured to split the first main optical fiber into at least one secondary optical fiber that is connected to a first split adapter port positioned in the panel and accessible for connection from the installer portion;
installing a second adapter port by connecting the second adapter port to the second main optical fiber and positioning the second adapter port in the panel such that the second adapter port is accessible for connection from the installer portion;
installing a first intermediary connector, which is connected to a first intermediary optical fiber, such that the first intermediary optical fiber leads around or through the panel and into the fiber management portion, wherein the first intermediary connector is accessible in the installer portion; and
installing a second splitter on the first intermediary optical fiber and positioning the second splitter within the fiber management portion such that the second splitter is configured to split the first intermediary optical fiber into a plurality of first distribution optical fibers that are each connected to one of a first set of distribution ports positioned in the panel and accessible for connection from the installer portion;
wherein the first intermediary connector is connectable to one of the first split adapter port or the second adapter port to enable an installer to selectively define a first splitter ratio for each of the first set of distribution ports such that a first downstream installation optical fiber connected to one of the first set of distribution ports receives output at the first splitter ratio.

22. A system for selectively defining optical fiber splitter ratios within an enclosure, the system comprising:
a feeder cable extending into the enclosure, wherein the feeder cable comprises a plurality of main optical fibers therein that extend into the enclosure, wherein the plurality of main optical fibers comprises at least a first main optical fiber, a second main optical fiber, and third main optical fiber;
a first splitter attached to the first main optical fiber and configured to split the first main optical fiber into a plurality of secondary optical fibers that are each connected to one of a first set of adapter ports positioned in the enclosure, wherein the first set of adapter ports comprises at least a first split adapter port and a second split adapter port;
wherein the second main optical fiber is connected to a second adapter port positioned in the enclosure;
wherein the third main optical fiber is connected to a third adapter port positioned in the enclosure;

a first intermediary connector connected to a first intermediary optical fiber;
a second splitter attached to the first intermediary optical fiber and configured to split the first intermediary optical fiber into a plurality of first distribution optical fibers that are each connected to one of a first set of distribution ports positioned in the enclosure;
a second intermediary connector connected to a second intermediary optical fiber; and
a third splitter attached to the second intermediary optical fiber and configured to split the second intermediary optical fiber into a plurality of second distribution optical fibers that are each connected to one of a second set of distribution ports positioned in the enclosure,
wherein the first intermediary connector is connectable to one of the first split adapter port, the second split adapter port, the second adapter port, or the third adapter port to enable an installer to selectively define a first splitter ratio for each of the first set of distribution ports such that a first downstream installation optical fiber connected to one of the first set of distribution ports receives output at the first splitter ratio,
wherein the second intermediary connector is connectable to one of the first split adapter port, the second split adapter port, the second adapter port, or the third adapter port to enable the installer to selectively define a second splitter ratio for each of the second set of distribution ports such that a second downstream installation optical fiber connected to one of the second set of distribution ports receives output at the second splitter ratio.

23. A system for selectively defining optical fiber splitter ratios within an enclosure defining a fiber management portion and an installer portion with a panel extending therebetween, the system comprising:
a feeder cable extending into the enclosure, wherein the feeder cable comprises a plurality of main optical fibers therein that extend into the fiber management portion of the enclosure, wherein the plurality of main optical fibers comprises at least a first main optical fiber, a second main optical fiber, and third main optical fiber;
a first splitter positioned within the fiber management portion, attached to the first main optical fiber, and configured to split the first main optical fiber into a plurality of secondary optical fibers that are each connected to one of a first set of adapter ports positioned in the panel and accessible for connection from the installer portion, wherein the first set of adapter ports comprises at least a first split adapter port and a second split adapter port;
wherein the second main optical fiber is connected to a second adapter port positioned in the panel and accessible for connection from the installer portion;
wherein the third main optical fiber is connected to a third adapter port positioned in the panel and accessible for connection from the installer portion;
a first intermediary connector connected to a first intermediary optical fiber that leads around or through the panel and into the fiber management portion, wherein the first intermediary connector is accessible in the installer portion,
a second splitter attached to the first intermediary optical fiber and configured to split the first intermediary optical fiber into a plurality of first distribution optical fibers that are each connected to one of a first set of distribution ports positioned in the panel and accessible for connection from the installer portion;
a second intermediary connector connected to a second intermediary optical fiber that leads around or through the panel and into the fiber management portion, wherein the second intermediary connector is accessible in the installer portion, and
a third splitter attached to the second intermediary optical fiber and configured to split the second intermediary optical fiber into a plurality of second distribution optical fibers that are each connected to one of a second set of distribution ports positioned in the panel and accessible for connection from the installer portion,
wherein the first intermediary connector is connectable to one of the first split adapter port, the second split adapter port, the second adapter port, or the third adapter port to enable an installer to selectively define a first splitter ratio for each of the first set of distribution ports such that a first downstream installation optical fiber connected to one of the first set of distribution ports receives output at the first splitter ratio,
wherein the second intermediary connector is connectable to one of the first split adapter port, the second split adapter port, the second adapter port, or the third adapter port to enable the installer to selectively define a second splitter ratio for each of the second set of distribution ports such that a second downstream installation optical fiber connected to one of the second set of distribution ports receives output at the second splitter ratio.

\* \* \* \* \*